June 12, 1956  V. C. WESTCOTT ET AL  2,750,566
TELEMETERING TRANSMISSION SYSTEMS
Filed June 4, 1948  23 Sheets-Sheet 1

INVENTORS
VERNON C. WESTCOTT
LEONHARD KATZ
GEORGE W. SCHIFF
BY
ATTORNEY

FRAME SYNC. GENERATOR AND
PREMODULATOR VECTOR RELATIONS

INVENTORS
VERNON C. WESTCOTT
LEONHARD KATZ
GEORGE W. SCHIFF
BY
ATTORNEY

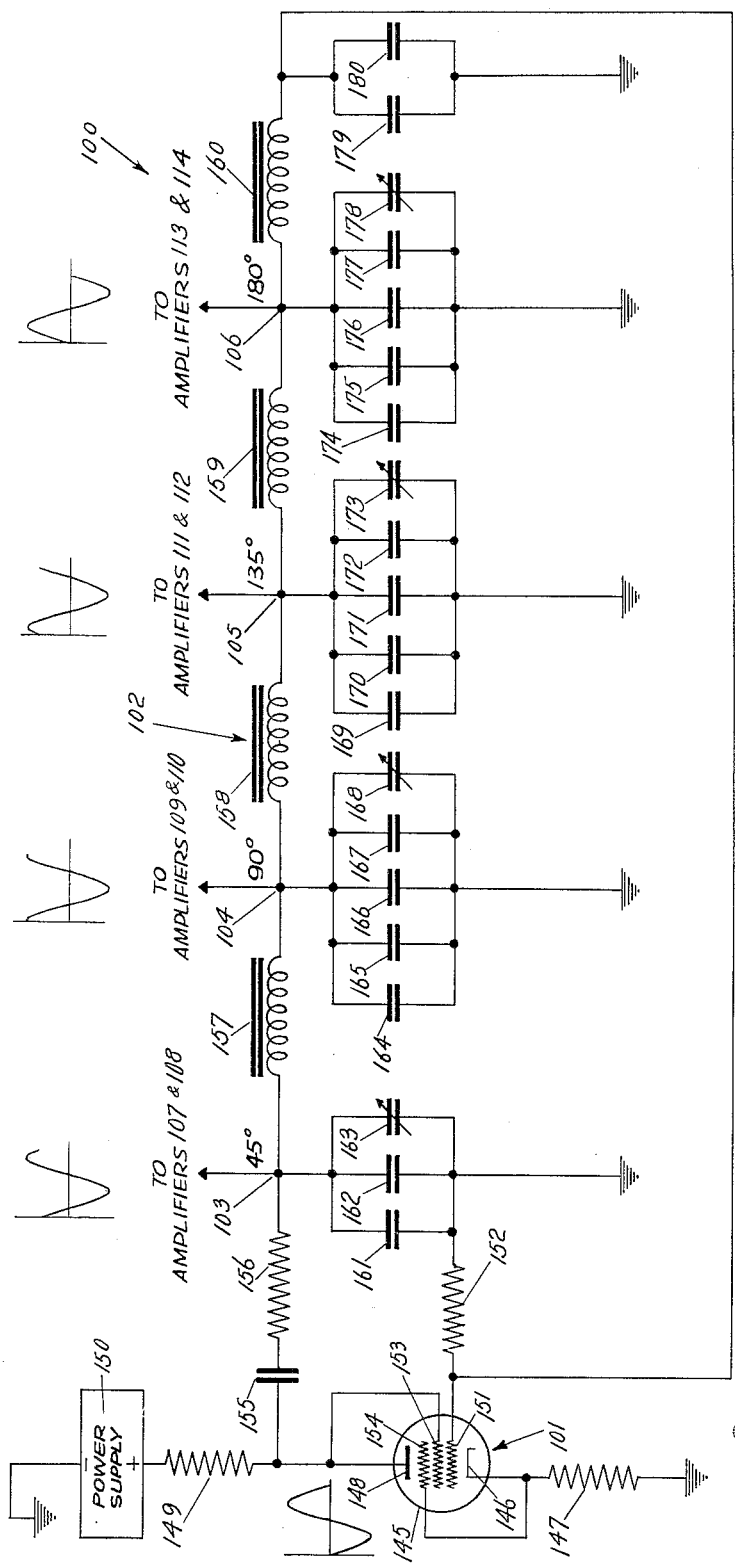

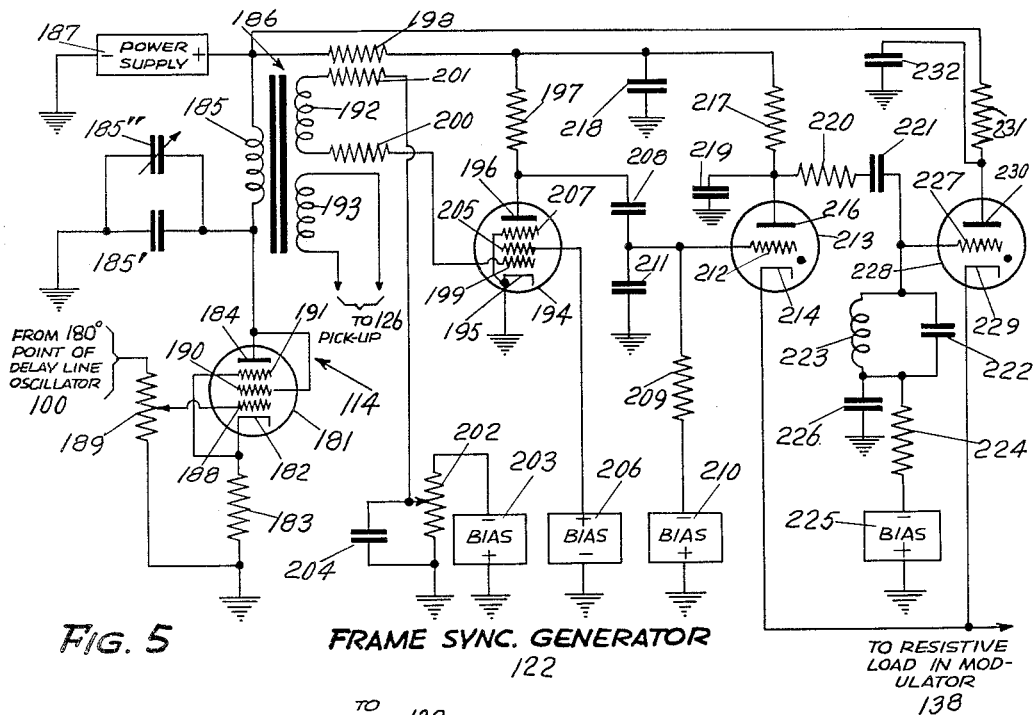
FIG. 5    FRAME SYNC. GENERATOR 122
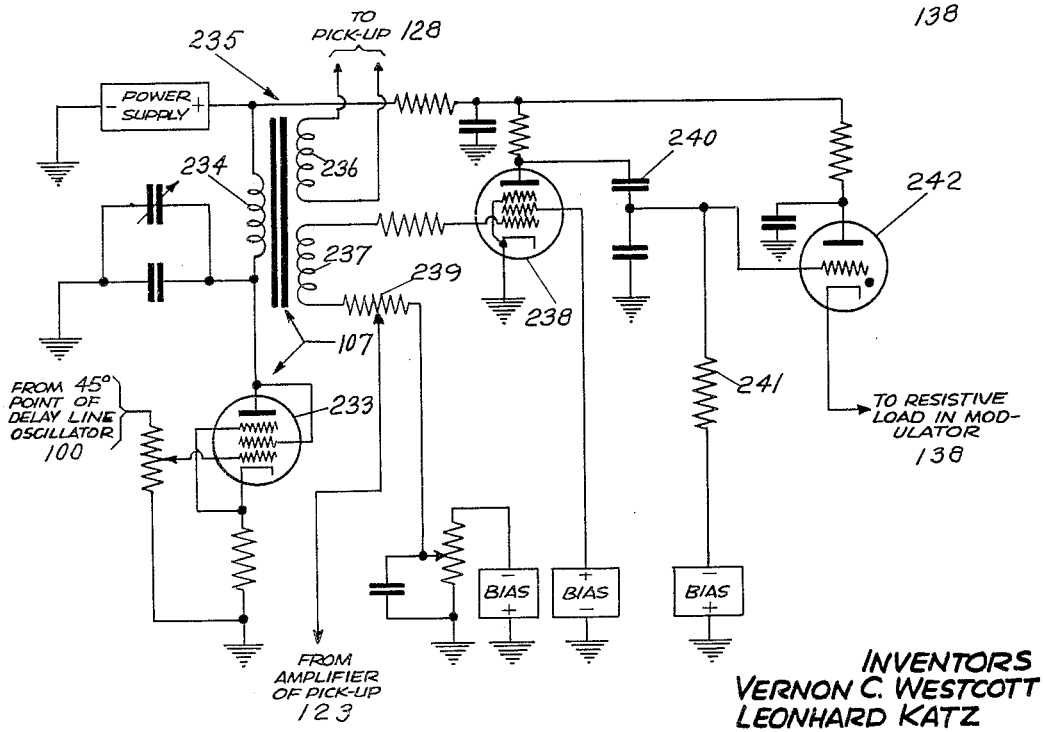
FIG. 6    PREMODULATOR 115
INVENTORS
VERNON C. WESTCOTT
LEONHARD KATZ
GEORGE W. SCHIFF

PICK-UP AND AMPLIFIER 123

MODULATOR AND TRANSMITTER
138 & 139

INVENTORS
VERNON C. WESTCOTT
LEONHARD KATZ
GEORGE W. SCHIFF

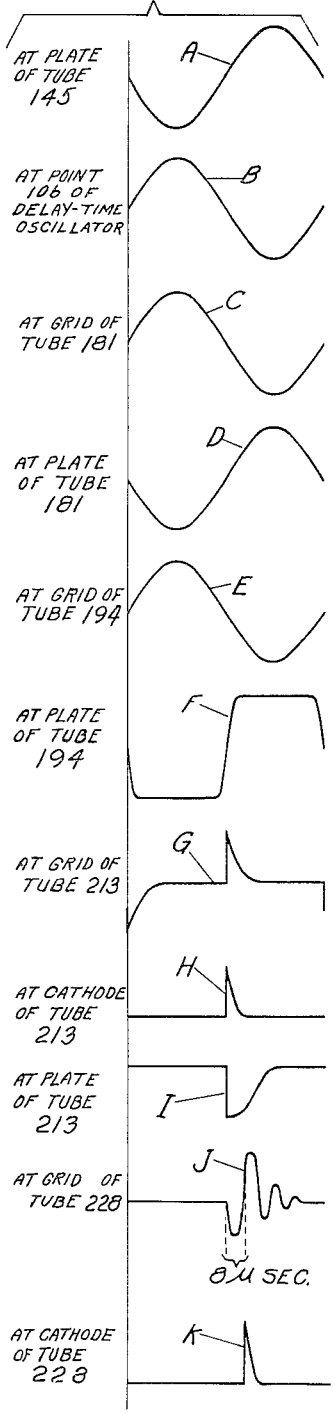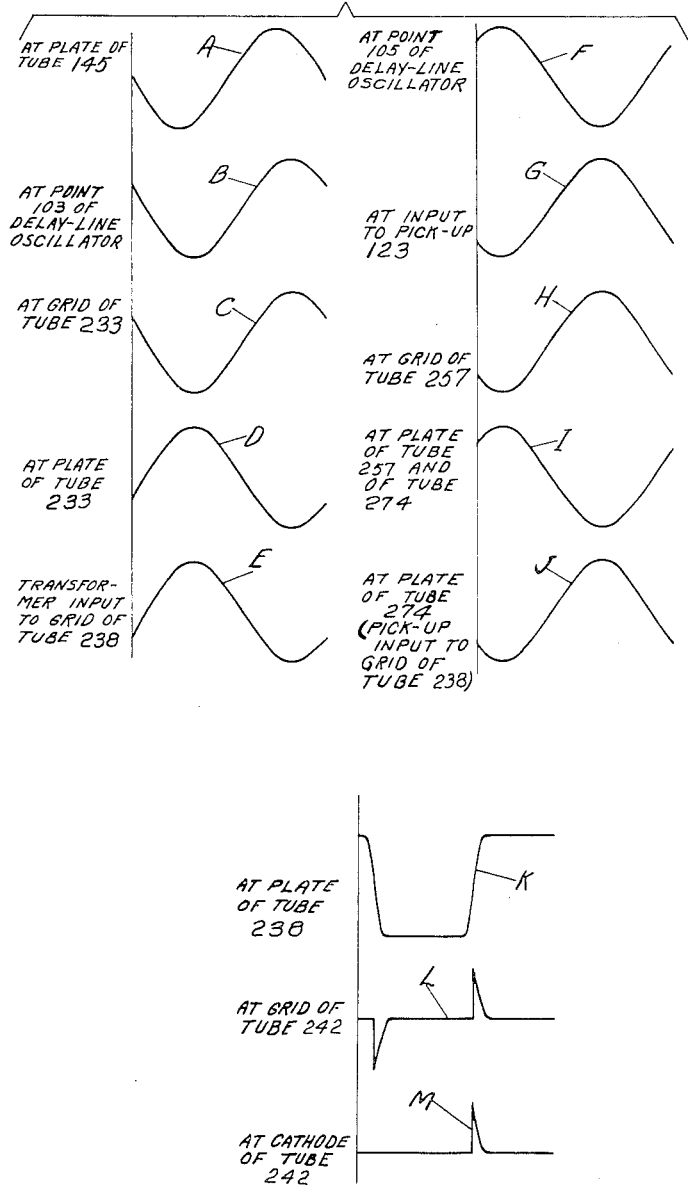

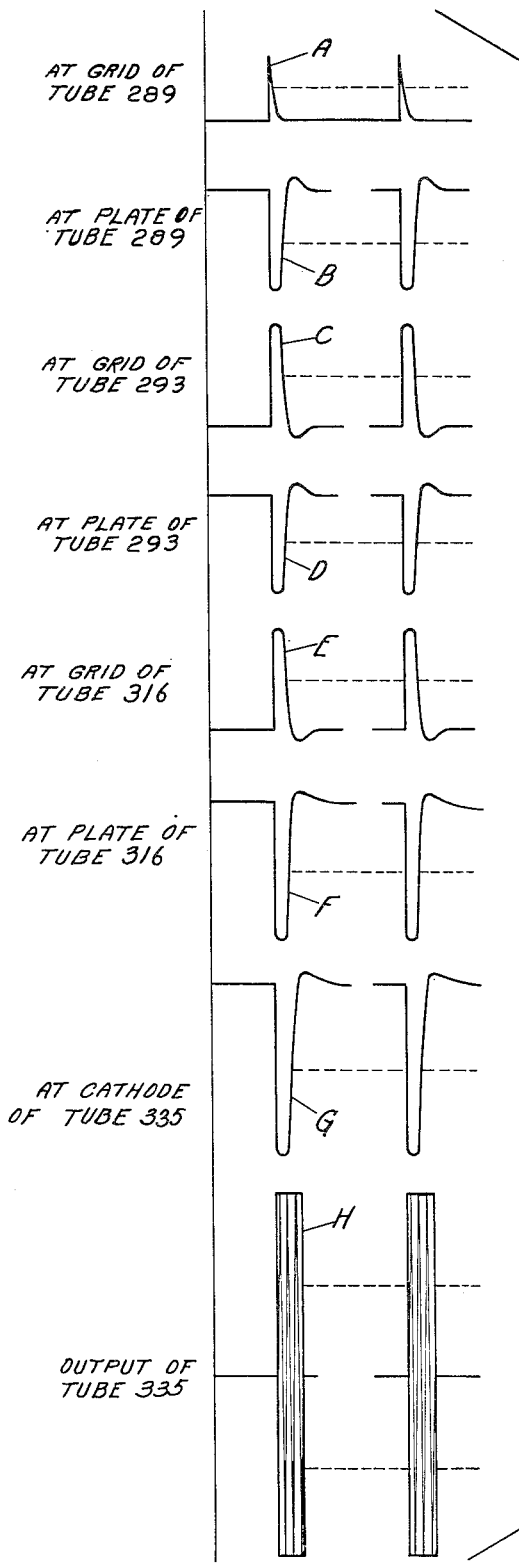

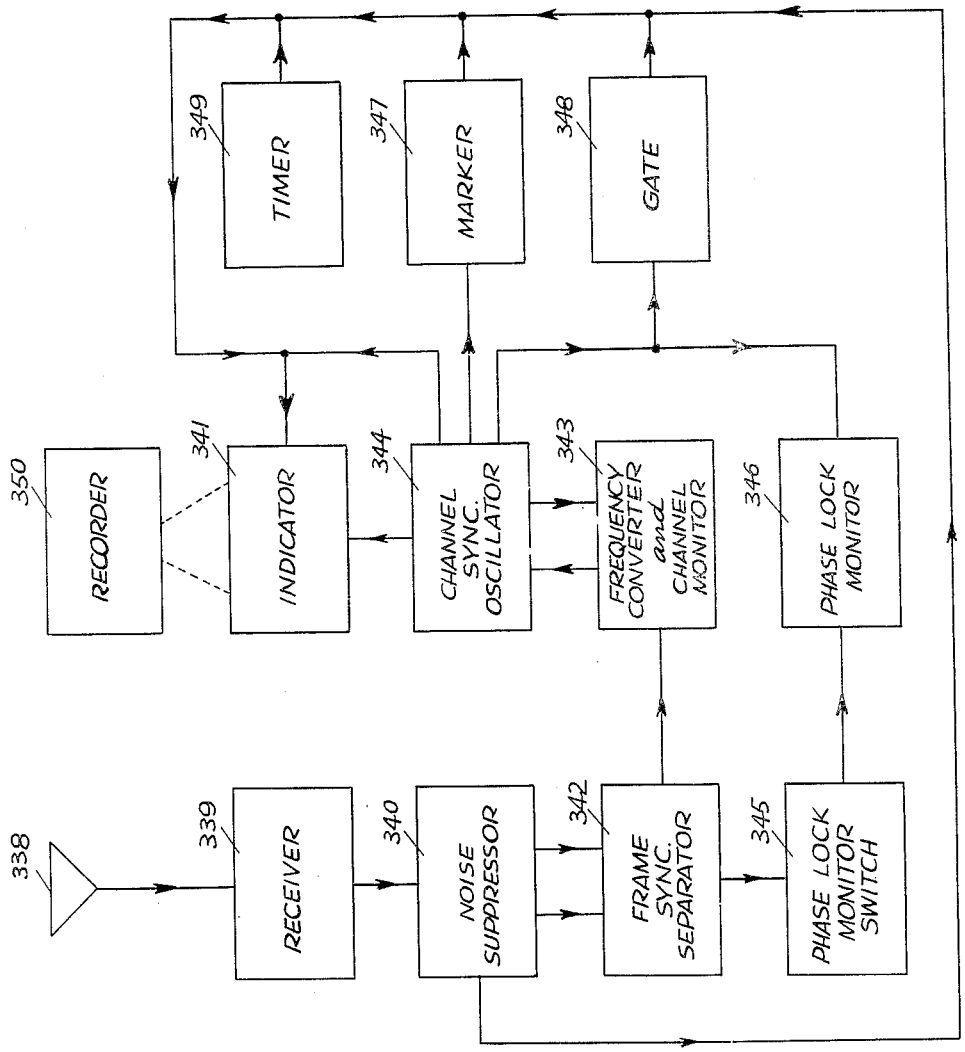

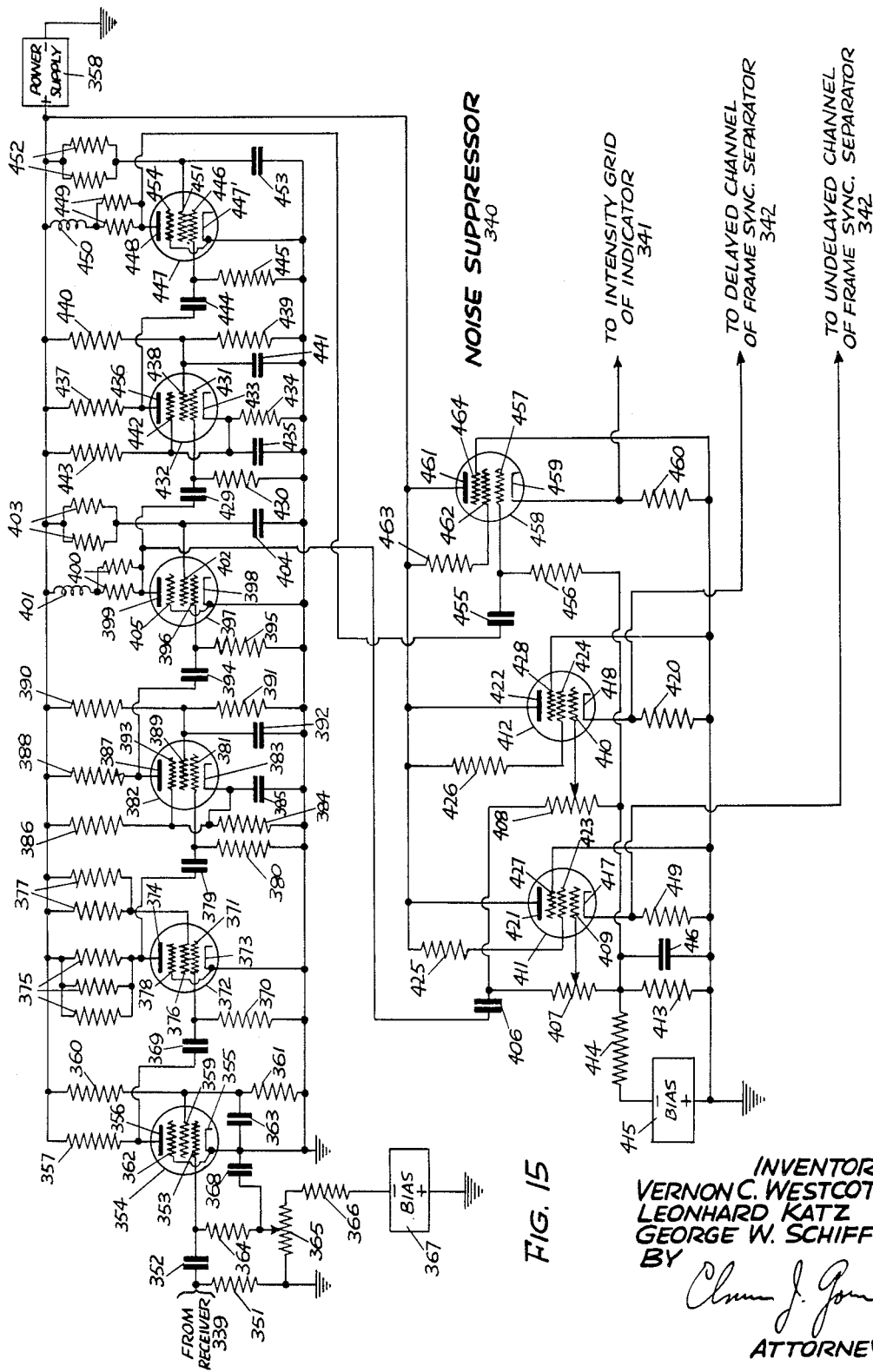

FIG. 16

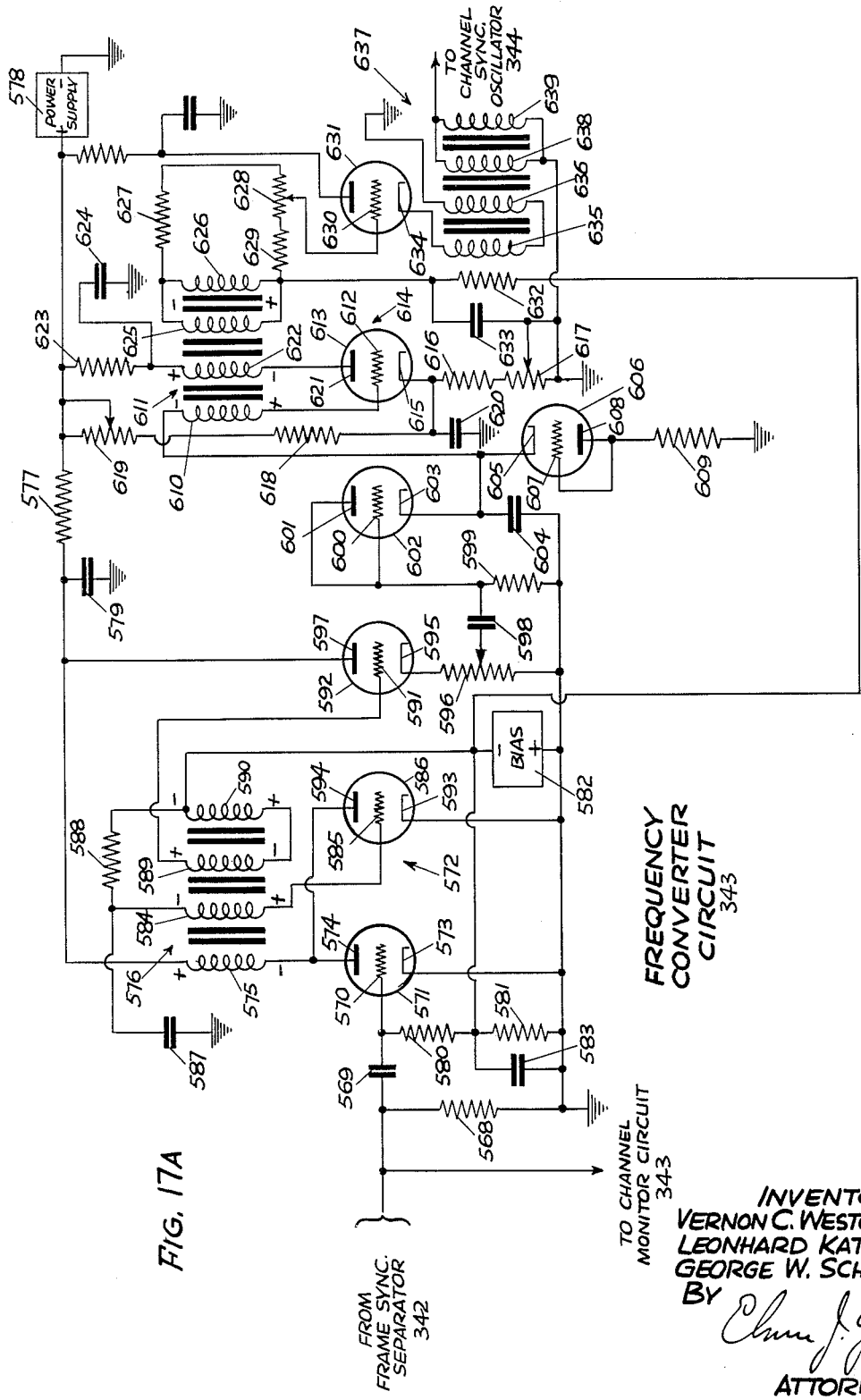

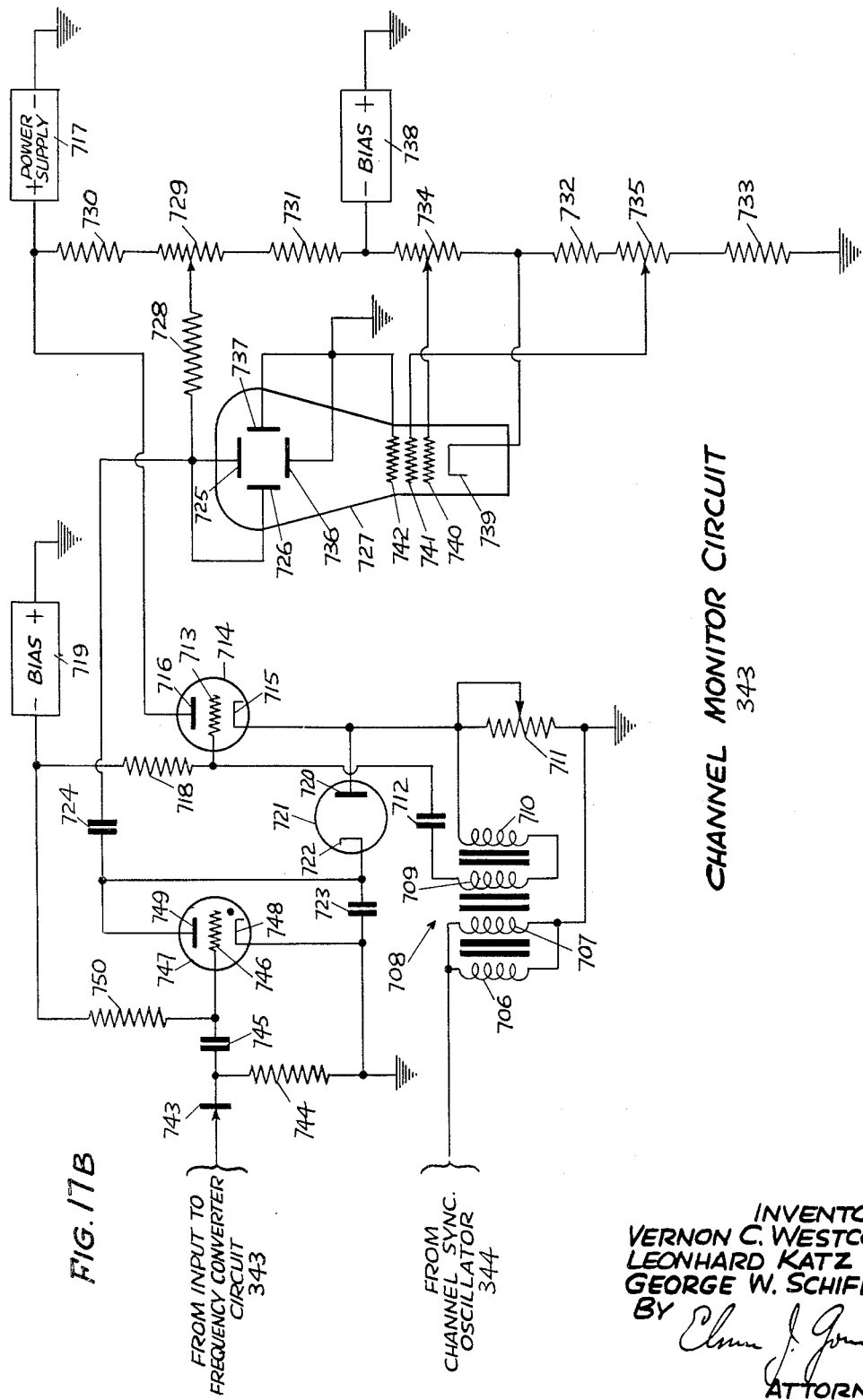

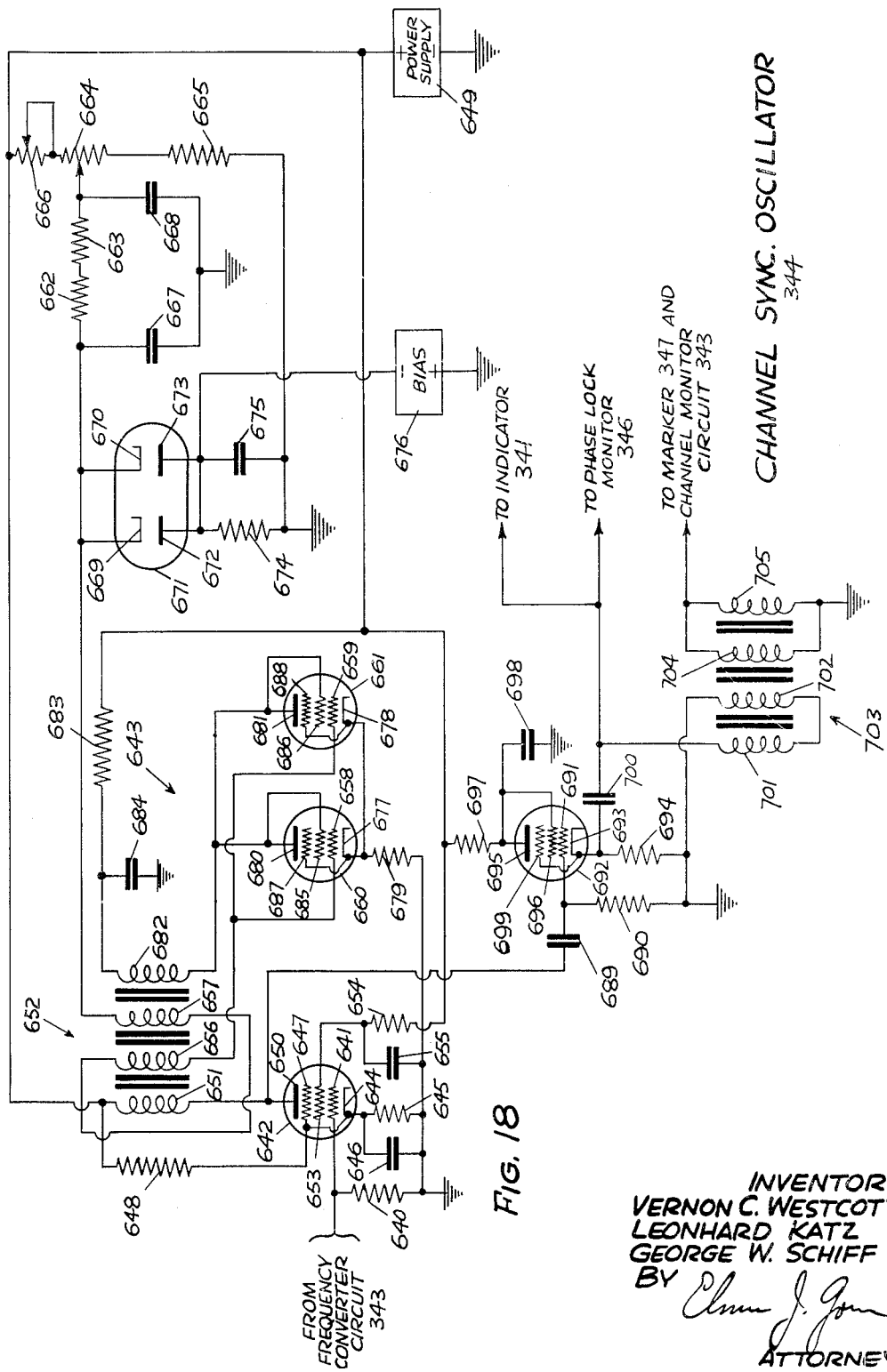

INVENTORS
VERNON C. WESTCOTT
LEONHARD KATZ
GEORGE W. SCHIFF
BY
ATTORNEY

INDICATOR SCOPE TUBE

United States Patent Office 2,750,566
Patented June 12, 1956

2,750,566

TELEMETERING TRANSMISSION SYSTEMS

Vernon C. Westcott, Lincoln, and Leonhard Katz and George W. Schiff, Woburn, Mass., assignors to Raytheon Manufacturing Company, Newton, Mass., a corporation of Delaware Application June 4, 1948, Serial No. 31,096

7 Claims. (Cl. 332—9)

This invention relates to radio system, and more particularly to the transmitting equipment of a multi-channel, pulse-position-modulated telemetering system employing a microwave radio link.

A pulse-position-modulated radio system is defined herein as a system in which intelligence is conveyed as a function of time elapsing between a fixed reference point in a time interval of predetermined duration, known as a channel, and the occurrence of an intelligence-conveying pulse.

A multi-channel radio system is defined herein as a system in which, during each of recurring time intervals of like predetermined duration, known as frames, a selected number of channels, as that term has been defined above, is sequentially transmitted.

While not limited thereto, the present invention is especially suitable for the transmission of various types of information, for example, strain data, from an airborne vehicle to a receiving station on the ground.

One of the objects of this invention is to provide a transmitter of the general character above referred to which assures an equal time interval between all of the intelligence-conveying channels thereof, even in the presence of frequency drift.

Another object of this invention is to provide equipment capable of the sequential transmission of a multiplicity of messages in a manner permitting the making of a permanent record thereof at the receiving station.

A further object of this invention is to provide the above-described transmitter with means for identifying the various intelligence-conveying channels thereof, whereby the records made at the receiving station may be easily separated and read without confusion.

These, and other objects, which will become more apparent as the detailed description herein progresses, are attained by the present invention, in general, in the following manner.

Means are provided for generating electrical oscillations (1) of a relatively high frequency, for example, in the microwave region of the spectrum, hereinafter called the carrier frequency, and (2) of a relatively low frequency, for example, an audio frequency, hereinafter called the frame frequency. The former may be of the order of 3000 megacycles per second and the latter may be of the order of 1390 cycles per second. With such a frame frequency, the frame length or time interval is approximately 720 microseconds.

From the above-mentioned frame frequency oscillations there is derived a plurality of signals of different relative phases, each phase corresponding to an intelligence-conveying channel. In the system to be described herein, there are eight channels successively differing in phase by 45°. It follows that the channel switching rate is 11,120 per second (8×1390), so that if desired, each channel can be of approximately 90 microseconds duration. However, a channel width of 20 microseconds has arbitrarily been chosen, whereby, if desired, the system can accommodate up to a total of 36 channels by deriving from the above-stated frame frequency oscillations channel signals differing in phase by exactly 10°.

In any event, one of the channel signals, preferably, the one corresponding to zero phase of the frame frequency oscillations, is selected as a reference signal, and there is derived therefrom a characteristic signal, hereinafter referred to as the frame sync signal, whereby the receiving equipment may properly be synchronized with the transmitting equipment. The remaining channel signals are transformed into pulses of about ½ microsecond width, these pulses then being positioned in their respective channels in accordance with the intelligence it is desired to transmit, whereupon, all of these pulses, including the frame sync signal, are applied to the carrier wave generator sequentially to pulse-position modulate the same.

It is preferred, in order readily to identify the various intelligence-conveying channels at the receiver, periodically to interrupt the modulation of the channel signals in succession, the blanks caused at the receiver by such interruptions serving the purpose as will later be explained.

The receiving equipment includes a purse receiver, the output of which is applied, through a noise suppressor circuit, to a frame sync signal separator which, in response to the characteristic frame sync signals originally transmitted, generates local frame sync signals. The latter, the frequency of which corresponds to the frame frequency, in the case under consideration 1390 cycles per second, are applied to a frequency converter and channel monitor which, in turn, synchronizes a local channel sync signal generator, in other words, a local oscillator, designed to operate at the channel switching rate above mentioned, namely, 11,120 cycles per second. The channel monitor portion of this unit enables checking of the frequency relationship between the local frame sync and local channel sync signals. Means are also provided for checking the relative phases of said local frame sync and local channel sync signals.

The output of the local channel sync signal generator is utilized to control an indicator, for example, to trigger the sweep-generating circuit of a cathode-ray oscilloscope. Preferably, the sweep of said oscilloscope is somewhat longer than the length of each intelligence-conveying channel, for example, about 21 microseconds.

The signals obtained from the local channel sync signal generator, and the video signals obtained from the receiver through the noise suppressor, in other words, the seven information signals, are utilized to intensity modulate the electron beam of the indicating oscilloscope.

The oscilloscope is intensity modulated by three additional signals: (1) the local channel sync signals, in addition to triggering the sweep of the oscilloscope, are delayed for 20 microseconds to produce a signal corresponding to the end of each channel; (2) the local channel sync signals, in addition to the foregoing, control a gating circuit which biases the oscilloscope to cut-off after each sweep to prevent spurious signals from registering; and (3) a timing circuit intensifies the oscilloscope beam at regular intervals, for example, once per second, to permit time synchronization of the permanent record.

Thus, during each sweep of the oscilloscope, the electron beam is intensified at three instants: (1) at the beginning, by the local channel sync signal; (2) during the sweep, whenever the channel information pulse occurs; and (3) at the end of the channel interval, 20 microseconds after the initiating signal. This produces three bright spots on the oscilloscope screen for each sweep.

All channels are superimposed, and each channel occupies the full width of the screen.

The permanent record is made by photographing the oscilloscope screen, utilizing a motion picture camera from which the shutter has been removed and in which the film is caused to move continuously. Inasmuch as the beam of the oscilloscope is never deflected vertically, vertical separation of the bright spots of each channel is achieved by reason of the motion of the film. By proper selection of film speed, the repetitive signals of each channel are made to trace a substantially continuous line.

Inasmuch as, as indicated in earlier portions of this specification, the channel signals, as transmitted, have their modulation periodically interrupted in succession, the resulting gaps in the permanent record traces serve to identify the trace of each channel.

In the accompanying specification there shall be described, and in the annexed drawings shown, an illustrative embodiment of the transmitting system of the present invention. It is, however, to be clearly understood that it is not desired to be limited to the exact details herein shown and described for purposes of illustration only, inasmuch as changes therein may be made without the exercise of invention and within the true spirit and scope of the claims hereto appended.

In said drawings.

Figure 8:
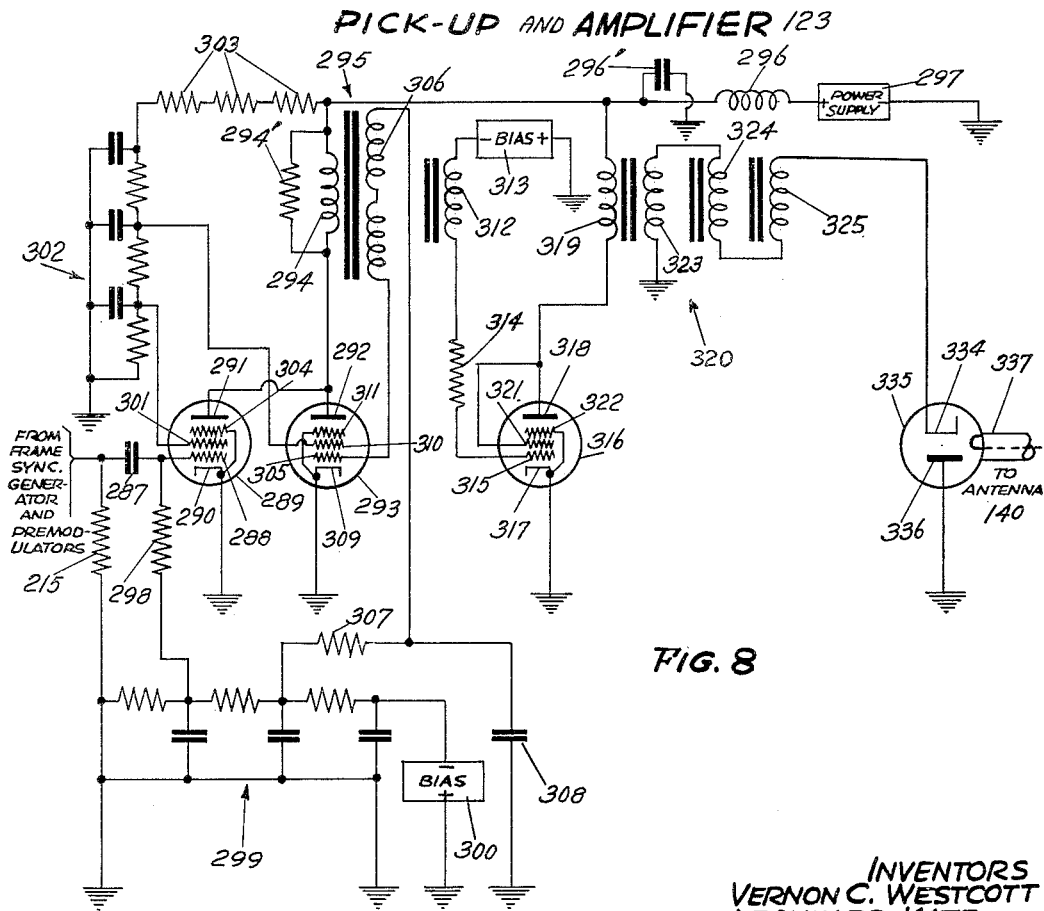
Figures 13, 14:
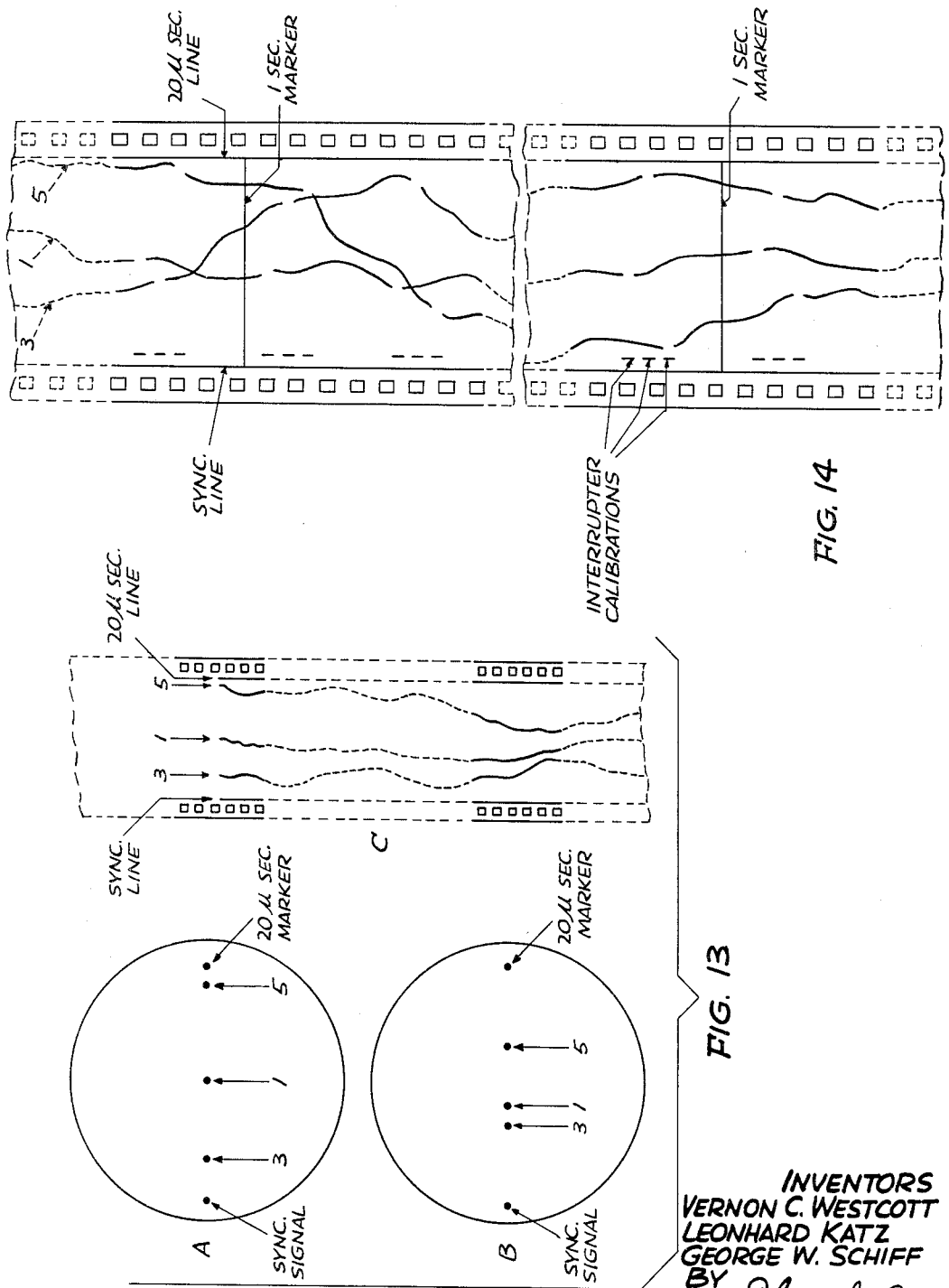

Figs. 4 to 8, inclusive, are circuit diagrams of various components of the transmitter of the present invention;

Figs. 9 to 11, inclusive, show, respectively, the wave shapes at various points in the circuits of Figs. 5, 6 and 8;

Fig. 12 is a block diagram of one form of receiving system which may be used in conjunction with the transmitting system of the present invention;

Figs. 13A, B and C illustrate, respectively, a typical appearance of the recording oscilloscope screen at some instant of time (only three channels are shown); a typical appearance of said screen at some instant of time later; and a strip of film which has been exposed to said screen during the time between said two typical screen appearances;

Fig. 14 is an enlarged, fragmentary view of a strip of film illustrating a record of various indicia applied thereto through the operation of the system of the present invention;

Figs. 15 to 19B, inclusive, are circuit diagrams of various components of the receiving system shown in Fig. 12; and Figs. 20 to 26B, inclusive, show, respectively, the wave shapes at various points in the circuits of Figs. 15 to 19B, inclusive.

Figure 1:
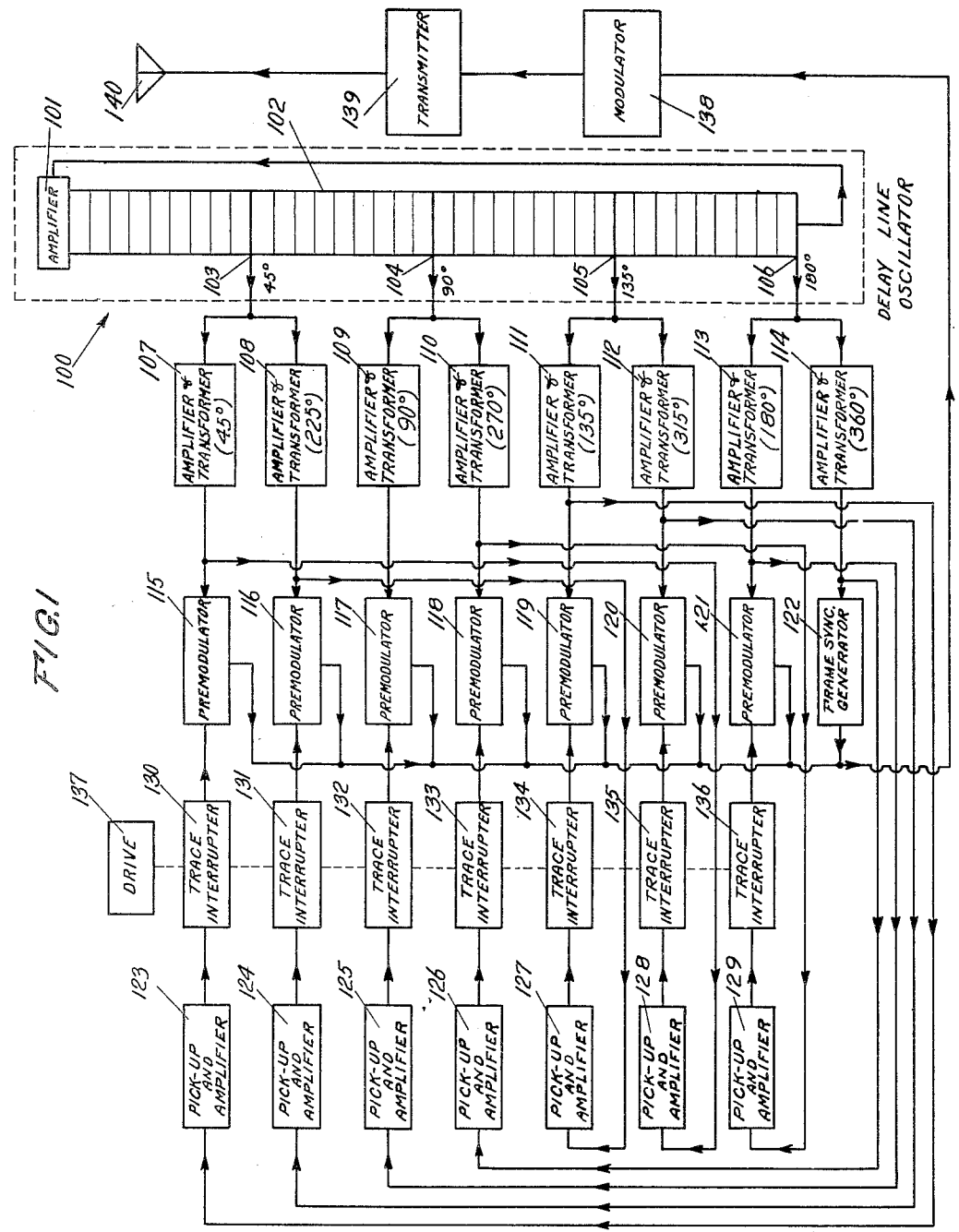
Fig. 1 is a block diagram of a transmitting system assembled in accordance with the present invention.

Referring now more in detail to the aforesaid illustrative embodiment of the transmitter of the present invention, with particular reference to the block diagram of the same shown in Fig. 1 of the drawings, the numeral 100 generally designates a means for generating electrical oscillations of a relatively low frequency, for example, 1390 cycles per second, hereinbefore referred to as the frame frequency. Such a means may consist of a delay line oscillator including an amplifier 101 in which positive feedback may be achieved through a delay line 102.

Where, as in the system under consideration, it is desired to provide eight channels during each frame, the delay line 102 may be tapped at four points 103 to 106, inclusive, corresponding, respectively, to phases of 45°, 90°, 135° and 180°, four additional phases, corresponding, respectively, to 225°, 270°, 315° and 360° or zero phase, being obtained, as will now be described.

The 45° signal is applied to a pair of amplifiers and transformers generally designated by the reference characters 107 and 108, the output from the former being taken in such a manner that the input thereto remains uninverted, and the output from the latter being taken in such a manner that the input thereto is inverted. There are thus obtained two signals 180° out of phase with respect to each other corresponding, respectively, to 45° and 225°.

In a similar manner, the 90°, 135° and 180° signals are applied, respectively, to pairs of amplifiers and transformers generally designated by reference characters 109 and 110, 111 and 112, and 113 and 114, each pair of amplifiers and transformers providing two signals 180° out of phase with respect to each other. The signals from the first of these pairs of amplifiers and transformers produce signals corresponding to 90° and 270°, the second, 135° and 315°, and the third, 180° and 360°.

The combined result is the production, from a single source, namely, the delay line oscillator 100, of eight channel signals successively differing in phase by 45°.

The outputs of the amplifiers and transformers 107 to 113, inclusive, are applied, respectively, to what may be termed premodulators, generally designated by reference characters 115 to 121, inclusive, to derive therefrom seven sharp. pulses by means of the position of each of which in its channel the desired information may be transmitted, and the output of the amplifier and transformer 114 is applied to what may be termed a frame sync. signal generator, generally designated by the reference character 122, to derive therefrom a characteristic signal, corresponding, preferably, to 360° or zero phase, by means of which the receiving system used in conjunction with the transmitting system of the present invention may be synchronized.

As will later be described in detail, the premodulators 115 to 121, inclusive, include grid-controlled, gas-discharge tubes arranged, in the absence of modulation, to fire, preferably, at the times the signals respectively applied thereto go through the 180° points of their cycles. The frame sync signal generator 122 also includes grid-controlled, gas-discharge tubes, one of which is arranged to fire, preferably, at a time corresponding to 9° or 18 microseconds before the signal applied thereto goes through the 180° point of its cycle, and another of which is arranged to fire, preferably, 4° or 8 microseconds later.

The gas-discharge tubes of the premodulators 115 to 121, inclusive, are further arranged so that, in the presence of modulation, they will fire at times within 5° on either side of the 180° points of the signals respectively applied thereto. In other words, these tubes will fire at times between the 175° and 185° points of the channel signals respectively applied thereto, the actual times of firing depending on the amplitudes of the modulating signals applied thereto. It will be noted that the 10° during which each tube may fire corresponds to a channel width of 20 microseconds.

Now, it is known that the time of the firing of a grid-controlled, gas-discharge tube, to the grid of which an A. C. is being applied, may be controlled by altering the static D. C. level of said grid with respect to the cathode. This phenomenon is employed in the present invention to cause each premodulator to fire within 5° on either side of the 180° point in the cycle of the A. C. applied thereto, whereby a voltage pulse is generated at a selected time in each channel to thereby attain pulse-position modulation.

For this purpose, pick-up devices and amplifiers, generaly designated by the reference characters 123 to 129, inclusive, wherein the pick-up devices may take the form of A. C. operated strain gauges mounted in bridge circuits, are supplied, respectively, with power from the transformers and amplifiers 111, 112, 113, 114, 108, 107 and 110. It is to be noted that the outputs of the pick-up devices and amplifiers 123 to 129, inclusive, are applied, through trace interrupters which will later be described, respectively, to premodulators 115 to 121, inclusive. These premodulators are also receptive, respectively, of the outputs of the amplifiers and transformers 107 to 113, inclusive. Thus, the premodulators are energized by power from the pick-up devices and amplifiers which, in each instance, is 90° out of phase with the power applied thereto from the amplifiers and transformers. In other words, the positive peaks of the outputs of the pick-ups and amplifiers normally coincide with the 180° points of the outputs of the amplifiers and transformers, which correspond, as above explained, to the normal times of firing of the premodulators. These times, in turn, correspond to the center points of the respective intelligence-conveying channels. It is to be understood, that this is not a necessary condition; the premodulators can be arranged by appropriate biasing normally to fire at any selected time within each 20-microseconds channel, for example, at the end, at the beginning, or elsewhere. On the other hand, it is desired that the second pulse generated by the frame sync generator 122 be made to correspond to the beginning of a channel, and it is for this reason that it is made to occur 5° or 10 microseconds before the 180° point in the cycle of the signal applied to said generator.

In order easily to identify the various channels, there may be interposed between the pick-ups and amplifiers 123 to 129, inclusive, and the premodulators 115 to 121, inclusive, what may be termed trace interrupters, generally designated by the reference characters 130 to 136, inclusive, these trace interrupters being actuated by a suitable driving mechanism 137 periodically and in succession to interrupt the application of modulation to the premodulators. This interruption results, as will later be explained, in the provision of gaps in the channel traces at the receiver.

The frame sync generator 122 is not modulated as above, its function merely being to generate a characteristic frame sync. signal adapted to be utilized at the receiver to synchronize the latter with the transmitter. Such a characteristic signal may consist of two sharp pulses, the second of which occurs at the beginning of the frame sync channel, said pulses being separated by a predetermined time interval and being employed at the receiver to generate a single synchronizing signal occurring, as stated, at the commencement of each frame. In a system which includes seven information channels, such as is being described, the number of pulses may be two, separated by 8 microseconds. For systems including, for example, 35 information channels, three pulses separated by 8 microseconds would be appropriate.

The outputs of the premodulators 115 to 121, inclusive, and the frame sync generator 122 are combined in a modulator 138 which, under the control of these signals, applies power to a transmitter 139, the output of which is conveyed to a suitable antenna 140.

Figure 2:
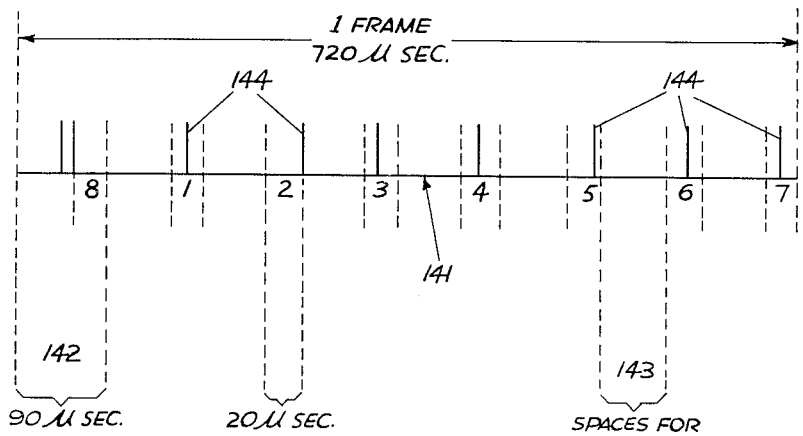
Fig. 2 is an example of various time relationships which might occur between channel pulses transmitted during any single frame.

Reference is now made to Fig. 2 of the drawings, showing an example of various pulse positions in the eight-channel system of the present invention. More specifically, there is shown a single frame 141 of 720 microseconds duration with channels numbered 8, 1, 2, 3, 4, 5, 6 and 7, corresponding, respectively, to the outputs of the frame sync generator 122 and the premodulators 115 to 121, inclusive, each channel being of 20 microseconds duration, the spaces 142 between the ends of adjacent channels being of 90 microseconds duration, leaving spaces 143, between the ends and beginnings of adjacent channels, of 70 microseconds for the accommodation of additional intelligence-conveying channels. It is to be particularly noted that the pulses 144 occur at many different times within the various channels.

Figure 3:
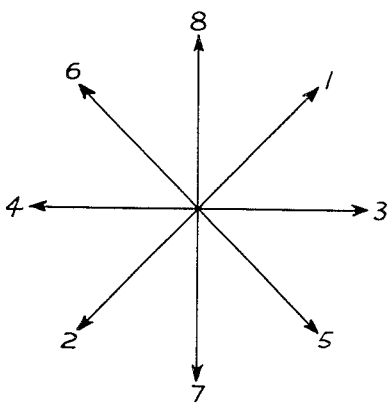
Fig. 3 illustrates the vector relationships between the unmodulated channel signals generated by the particular embodiment of the invention herein shown and described.

While Fig. 2 shows the channels numbered consecutively from left to right, it is to be noted that, because of the phase order of the inputs to the premodulators, as set forth in Fig. 1, said premodulators do not fire consecutively, but fire, rather, in the order indicated by the vector diagram of Fig. 3, wherein the numbers 8, 1, 3, 5, 7, 2, 4 and 6 correspond, respectively, to the premodulators 114, 107, 109, 111, 113, 108, 110 and 112. This arrangement is not necessary and, depending on the phase order of the feed to the premodulators, the latter may be made to fire in any desired different order.

While not limited thereto, Figs. 4 to 8, inclusive, show circuit diagrams which may be employed in the components shown in Fig. 1.

For example, Fig. 4 shows a specific form which the delay line oscillator 100 may take. This oscillator, as already indicated, may include an amplifier 101 and a delay line 102 connected between the output and input of said amplifier. More paticularly, the circuit may include a pentode vacuum tube 145, the cathode 146 of which is grounded through a resistor 147, the anode 148 of which is connected through a resistor 149 to the positive terminal of a suitable power supply 150 having its negative terminal grounded, the control grid 151 of which is grounded through a resistor 152, the screen grid 153 of which is connected to the anode 148, and the suppressor grid 154 of which is connected to the cathode 146. The anode 148 is connected back to the control grid 151 through a coupling capacitor 155, current-limiting resistor 156, and a plurality of inductors 157 to 160, inclusive. At the junction between the resistor 156 and the inductor 157, corresponding to the 45° point 103 of the line 102, said line is grounded through parallel-connected capacitors 161, 162 and 163, the latter being variable. At the junction between the inductors 157 and 158, corresponding to the 90° point 104 of said line, said line is grounded through parallel-connected capacitors 164 to 168, inclusive, the latter being variable. At the junction between the inductors 158 and 159, corresponding to the 135° point 105 of said line, said line is grounded through parallel-connected capacitors 169 to 173, inclusive, the latter being variable; and at the junction between the inductors 159 and 160, corresponding to the 180° point 106 of said line, said line is grounded through parallel-connected capacitors 174 to 178, inclusive, the latter being variable. Finally, the control grid end of the inductor 160 is grounded through parallel-connected capacitors 179 and 180.

Adjacent the tube 145, the anode output thereof at a given instant is shown, said output being considered as the reference for the purposes of this description, and, above the points 103 to 106, inclusive, of the line 102, there are shown the various phases of the voltages along said line, all related to said reference.

In Fig. 5, there is shown one form of circuit which may be employed in the frame sync generator 122 for the generation of the hereinbefore referred to characteristic frame sync. signals corresponding, preferably, to the 360° or zero phase of the output of the oscillator 100.

This circuit includes the amplifier and transformer 114, which may be fed from the 180° point 106 of the oscillator 100, and comprises a pentode vacuum tube 181, the cathode 182 of which is grounded through a resistor 183, and the anode 184 of which is connected through the primary winding 185 of a transformer 186 to the positive terminal of a power supply 187, the negative terminal of said power supply being grounded. The primary winding 185 is by-passed to ground by the parallel-connected capacitors 185' and 185'', the latter of which is variable. The control grid 188 of the tube 181 is connected to the adjustable arm of a potentiometer 189 connected between the point 106 of the oscillator 100 and ground. The screen grid 190 of said tube is tied to the anode 184, and the suppressor grid 191 is connected back to the cathode 182.

The transformer 186 is provided with two secondary windings 192 and 193, outputs from which are so taken as to invert the input to said transformer, the output from the secondary 192 being utilized to generate the frame sync signals and the output from the secondary 193 being utilized to energize the pick-up device and amplifier 126 (Fig. 1).

The pulse-generating portion of the frame sync generator 122 includes a pentode vacuum tube 194, the cathode 195 of which is directly connected to ground and the anode 196 of which is connected through resistors 197 and 198 to the power supply 187. The control grid 199 of said tube is connected through a resistor 200 to one end of the secondary 192 of the transformer 186, the other end of said secondary being connected through a resistor 201 to the adjustable arm of a potentiometer 202 connected between the negative terminal of a bias supply 203 and ground. The positive terminal of said bias supply is grounded directly, and the adjustable arm of said potentiometer is grounded through a capacitor 204. The screen grid 205 of the tube 194 is connected to the positive terminal of a bias supply 206 having its negative terminal grounded, and the suppressor grid 207 of said tube is connected back to the cathode 195. The biases applied to said tube are such that the sine-wave input thereto is, in effect, advanced in phase by 9° or 18 microseconds and is distorted to produce a square-wave output.

Said output is differentiated by a network comprising a capacitor 208 and resistor 209 connected in series with a negative bias supply 210, the positive terminal of which is grounded, said resistor 209 and bias supply 210 being by-passed by a grounded capacitor 211.

The pulses resulting from the differentiation are applied to the grid 212 of a grid-controlled, gas-discharge tube 213 having its cathode 214 connected to ground through a resistive load 215 (Fig. 8) located in the input circuit of the modulator 138. The anode 216 of said tube is connected through a resistor 217 and the resistor 198 to the power supply 187, said resistor 217 being by-passed by a capacitor 218 connected to ground. The tube is normally biased to cut-off, and, when made to conduct by the positive pulses appearing across the resistor 209, produces positive pulses across the load resistor 215 (Fig. 8), which is in its cathode circuit.

The anode output of said tube is applied across a parallel network including, in one leg, a capacitor 219, and, in the other leg, connected in series, a resistor 220, a capacitor 221, a ringing circuit including a capacitor 222 and an inductor 223 connected in parallel, a resistor 224, and a negative bias supply 225, the positive terminal of which is grounded. The resistor 224 and bias supply 225 are by-passed to ground by a capacitor 226, and the ringing circuit has a resonant frequency such that, when shock excited by the conducting state of the tube 213, the first positive alternation appearing thereacross occurs a predetermined time, for example, 8 microseconds, after the occurrence of the pulse across the resistive load 215 (Fig. 8) in the cathode circuit of said tube 213.

This delayed positive alternation is applied to the grid 227 of a second grid-controlled, gas-discharge tube 228, the cathode 229 of which is, like the cathode 214 of tube 213, connected to ground through the resistive load 215 (Fig. 8) in the modulator 138. The anode 230 of said tube 228 is connected through a resistor 231, by-passed by a capacitor 232, to the power supply 187. Said tube is biased so that only the first positive alternation of the ringing circuit is of sufficient amplitude to cause the same to conduct. When it conducts, a positive pulse is produced across the resistive load 215 (Fig. 8) in its cathode circuit, said pulse occurring 8 microseconds after the pulse produced by the first gas-discharge tube 213. There is thus generated a characteristic signal, which, as will later be explained, is employed at the receiver for synchronizing said receiver with the transmitter. The time of the second pulse of this characteristic signal corresponds to the beginning of a frame of channels.

For a better understanding of the operation of the circuit of Fig. 5, reference is now made to Fig. 9. There, at A, is shown the reference voltage at the plate of the tube 145 (Fig. 4) of the oscillator 100, and at B, is shown the output at point 106 on the delay line 102 of said oscillator, this output being 180° out of phase with the reference voltage. At C is shown the input to the control grid 188 of the tube 181, said input being inverted at the plate 184 of said tube, as at D. The plate output of said tube is inverted by the transformer 186 and the inverted voltage shown at E, is applied to the control grid 199 of the tube 194. Because of the method of biasing the tube 194, the voltage E is inverted and squared at the plate 196 thereof, as at F. The square wave thus obtained is differentiated by the R–C network 208–299, resulting in the application to the grid 212 of the tube 213 of the alternately positive and negative pulses shown at G. The positive pulses trigger the tube 213 which produces the sharp positive pulses H in the cathode circuit of said tube. The conduction of said tube 213 also produces the less sharp negative pulses shown at I which cause the ringing circuit, including the capacitor 222 and inductor 223, to become shock excited and generate the damped oscillations shown at J. These oscillations appear at the grid 227 of the tube 228 and cause said tube to conduct when the amplitude of the first positive alternation becomes sufficient to overcome the negative bias on the tube, said bias normally being so set that, in the case under consideration, the tube fires 8 microseconds after the tube 213 fires. Upon said tube 228 firing, sharp positive pulses, as shown at K, are produced in the cathode circuit thereof. It will be noted that the pulses H and K, both of which appear across the load resistor 215 (Fig. 8) in the modulator 138, are displaced in time by the above referred to 8 microseconds.

We come now to a description of one form of circuit which may be used in the premodulators 115 to 121, inclusive, and for this purpose, reference is made to Fig. 6, wherein, specifically, the premodulator 115 is shown. This circuit is very similar to the frame sync. generator circuit of Fig. 5, for which reason it will not be described with as great detail.

This circuit includes a vacuum tube 233 fed from the 45° point 103 (Fig. 4) of the oscillator 100, its output being applied to the primary winding 234 of a transformer 235 including two secondary windings 236 and 237. The outputs from the secondary windings are so taken that the input to the primary winding 234 is not inverted. The secondary 236 is connected to the input of the pick-up device 128 (Fig. 1) and the secondary 237 is connected to the input of a vacuum tube 238. The tube 238 also has applied to it, across a potentiometer 239 connected in series wtih the secondary 237, the output from the amplifier of the pick-up device 123 (Fig. 1), which output is 90° out of phase with the output of said secondary 237. The tube is so biased that the combined inputs thereto are distorted to produce a square-wave output at the anode thereof, which square-wave output is differentiated by a network including a series-connected capacitor 240 and a resistor 241. The resulting pulses are applied to a grid-controlled, gas-discharge tube 242 to cause said tube normally to fire at times corresponding to the 180° points in the cycle of the transformer input to the tube 194 and to produce sharp pulses across the resistive load 215 (Fig. 8) in the modulator 138, which resistive load is in the cathode circuit of said tube 242.

Inasmuch as the tube 238 is fed a signal, not only from the transformer 235, but also from the pick-up and amplifier 123, it is thought best, at this time, and before describing the operation of the circuit with the aid of the wave shapes shown in Fig. 10, to describe the circuit of said pick-up and amplifier 123.

Figure 7:
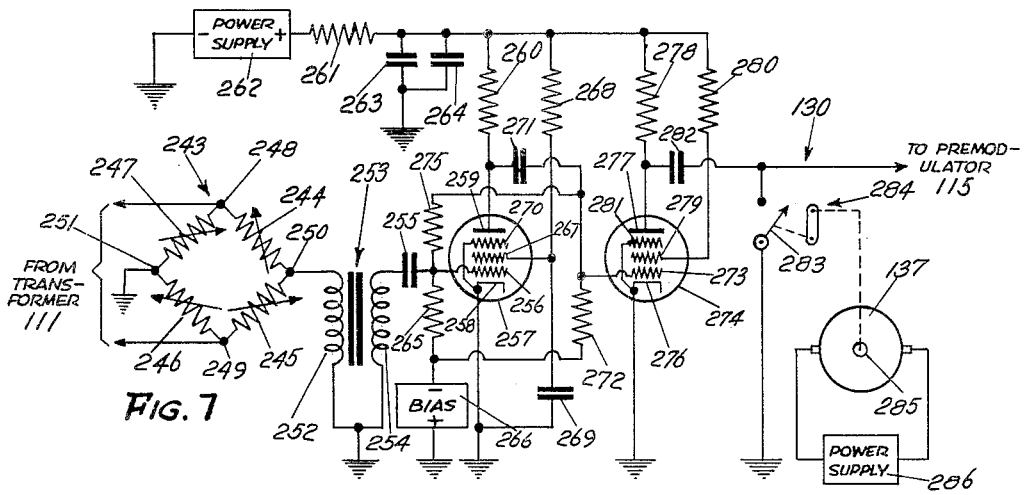

For this purpose, reference is made to Fig. 7, which includes the trace interrupter 130 as well as the pick-up and amplifier 123.

In this figure, the numeral 243 generally designates a resistance bridge, including four variable resistors 244 to 247, inclusive, having input terminals 248—249 adapted to be energized from one of the secondary windings of the transformer included in the amplifier and transformer 111, in turn, included in the premodulator 119 (Fig. 1), it being noted that the input to this bridge is 90° out of phase with the input to the premodulator 115. While the bridge has been shown as comprised of resistors, it is to be understood that reactors can be used just as well. The bridge may initially be adjusted to a condition of balance, in which case normally there will be no output across the terminals 250—251 thereof, but it is preferred that the initial adjustment be such that normally there is a predetermined output across the output terminals corresponding to a selected value of the parameter to be measured by the particular pick-up associated with the bridge.

After initial adjustment, one of the resistors, for example, the resistor 244, is intended to be actuated by any suitable strain, pressure, or other external phenomenon-responsive mechanism (not shown), whereby the amplitude of the output of the bridge becomes a function of the magnitude of the phenomenon being measured.

The output of the bridge 243 is fed to the primary winding 252 of a transformer 253 having a secondary winding 254, the output of the latter being applied, through a coupling capacitor 255, to the control grid 256 of a pentode vacuum tube 257. The cathode 258 of said tube is grounded and the anode 259 thereof is connected through resistors 260 and 261 to the positive terminal of a power supply 262 having its negative terminal grounded. The resistor 261 is by-passed to ground by parallel-connected capacitors 263 and 264. The control grid 256 is returned to ground through a resistor 265 and a negative bias supply 266, and the screen grid 267 is connected through a resistor 268, by-passed by a capacitor 269, and the resistor 261 to the power supply 262. The suppressor grid 270 is tied back to the cathode 258.

The anode output of the tube 257 is applied through a capacitor 271 across a resistor 272 which is connected between the control grid 273 of another vacuum tube 274 and the negative bias supply 266. Said anode output is also applied back to the control grid 256 of the tube 257 across a resistor 275.

The tube 274 includes a cathode 276 connected to ground and an anode 277 connected through a resistor 278 and the resistor 261 to the power supply 262. The screen grid 279 of said tube 274 is connected through a resistor 280 and the resistor 261 to said power supply 262, and the suppressor grid 281 of said tube is tied back to the cathode 276.

The anode output of the tube 274 is coupled through a capacitor 282 to the adjustable arm of the potentiometer 239 (Fig. 6) in the premodulator 115. Said anode output is, in addition, shunted by the trace interrupter 130, the latter consisting, for example, of a switch 283 adapted to be opened and closed by a suitable linkage 284, in turn, actuated by a cam (not shown) on the shaft 285 of the driving mechanism 137, which may be an electric motor fed from a power supply 286.

By this arrangement, the output of the tube 274 is shunted to ground whenever the switch 284 is closed. At such times, no modulation is fed to the premodulator with which the particular trace interrupter is associated, the negative bias on the tube 238 of the premodulator is shorted, and so, said premodulator fires at a time to produce a pulse only near the beginning of the corresponding channel. This results in the appearance of a gap in the receiver record of the trace of said corresponding channel. The cams corresponding to the interrupters 130 to 136, inclusive, may be angularly staggered on the shaft 285 so that the modulation signals applied to the premodulators 115 to 121, inclusive, are periodically and sequentially interrupted.

Returning now to the description of the operation of the premodulator 115, for which purpose reference is made to the circuit of Fig. 6 and the wave shapes of Fig. 10, there is again shown, at A in the latter figure, the reference voltage at the plate of the tube 145 of the oscillator 100 (Fig. 4). At B, there is shown the output at the 45° point 103 of the delay line 102 of said oscillator. This output, as shown at C, is applied to the grid of the tube 233 of the premodulator 115. Inversion takes place at the plate of said tube, as at D, and the output of the transformer 235 is so taken as not to invert the input thereto, whereby the input to the grid of the tube 238 is as a E.

As previously stated, said tube 238 is also receptive of the output of the pick-up and amplifier 123 shown in Fig. 7. The input to said pick-up and amplifier 123 is obtained, through the amplifier and transformer 111 included in the premodulator 110, originally from the 135° point 105 of the delay line 102 of the oscillator 100, which is as shown at F in Fig. 10. After passing through said amplifier and transformer 11, the actual input to the pick-up and amplifier 123 is as shown at G in said Fig. 10. The transformer 253 does not invert this input and, therefore, the wave shown at H is applied to the grid of the tube 257. The tube 257, however, inverts the input thereto and there appears at the plate of said tube, and at the grid of the tube 274, the wave shown at I. This, in turn, is inverted, as at J, the latter being applied across the potentiometer 239 to the grid of the tube 238.

The grid of the last-named tube thus has two sinusoidal signals, E and J, applied thereto, said signals being 90° out of phase with each other. The combined input to the tube 238 is distorted to produce, at the plate of said tube, the square wave shown at K. This square wave is differentiated across the network, including the capacitor 240 and the resistor 241, producing the alternately positive and negative pulses shown at L. These pulses are applied to the tube 242 which generates in its cathode circuit the final sharp positive pulses shown at M.

Of course, as the amplitude of the output of the pick-up and amplifier 123 changes in response to the parameter being measured thereby, the premodulator output will be advanced or retarded about the center point of the channel with which said premodulator is associated.

We come now to a description of one form which the modulator 138 and transmitter 139 may take, and, for this purpose, reference is made to Fig. 8.

As previously indicated on several occasions, the resistor 215 constitutes a common load in the cathode circuits of the final stages in the frame sync generator 122 and the premodulators 115 to 121, inclusive. The pulses appearing across said resistor 215 are applied through a coupling capacitor 287 to the control grid 288 of a pentode vacuum tube 289. Said tube 289 includes a cathode 290 directly connected to ground, and an anode 291 connected to the anode 292 of another pentode vacuum tube 293 and, through the primary winding 294 of a transformer 295, and a radio-frequency choke 296, which is by-passed by a capacitor 296', to the positive terminal of a power supply 297 having its negative terminal grounded. The primary winding 294 is shunted by a damping resistor 294'.

The control grid 288 of the tube 289 is connected through a resistor 298 to an appropriate point on a resistance-capacitance filter 299 connected across a negative bias supply 300, the positive terminal of which is grounded. The screen grid 301 of said tube is connected to an appropriate point on a resistance-capacitance filter 302 connected, in turn, through the resistance 303 and the choke 296 across the power supply 297. The suppressor grid 304 is tied back to the cathode 290. The control grid 305 of the tube 293 is connected through the secondary winding 306 of the transformer 295 and a resistor 307, by-passed by a capacitor 308, to an appropriate point on the filter network 299. The cathode 309 of the tube 293 is grounded, the screen grid 310 thereof is connected to an appropriate point on the filter network 302, and the suppressor grid 311 thereof is tied back to said cathode 309.

It will be noted that the outputs of the tubes 289 and 293 are connected in parallel, with part of said output fed back to the tube 293 through the transformer 295. The latter includes a tertiary winding 312 connected at one end to the negative terminal of a bias supply 313 having its positive terminal grounded, and at the other end, through a resistor 314, to the control grid 315 of a third vacuum tube 316. The cathode 317 of said tube 316 is grounded and the anode 318 thereof is connected through the primary winding 319 of a transformer 320, and the choke 296, to the power supply 297. The screen grid 321 of said tube is tied to the anode 318, and the suppressor grid 322 is connected to the cathode 317.

The transformer 320 includes a secondary winding 323, one end of which is grounded and the other end of which is connected to a tertiary winding 324 which, in turn, is connected to another winding 325.

The latter winding is connected to the cathode 334 of a microwave generator, such as a magnetron 335, the anode 336 of said generator being grounded. The output of the generator 335 may be applied to the antenna 140 by means of a pick-up loop and coaxial line 337.

The circuit just described is such that each pulse applied thereto drives the magnetron cathode 334 highly negative with respect to the anode 336, thereby exciting said magnetron into microwave oscillations.

For a more complete understanding of the operation of the circuit of Fig. 8, reference is made to Fig. 11. At A in said figure, there is shown the sharp positive pulses constituting the outputs of the premodulators 115 to 121, inclusive, and the frame sync. generator 122, and the input to the grid 288 of the tube 289. The broken lines in this figure merely indicate that the pulses are repeated. The input of A is inverted at the plate 291 of the tube 289 and is distorted, by reason of the connection of the damped primary winding 294 to said plate 291, to produce the negative pulses shown at B. The transformer 295 inverts these pulses and feeds to the grid 305 of the tube 293 the positive pulses shown at C. The plate output of the tube 293 is, of course, the same as the plate output of the tube 289, as shown at D. The last-named pulses are inverted by the transformer winding 312 which applies the same, as positive spikes E, to the grid 315 of the tube 316. At the plate of the tube 316 there appears the pulses F which are then greatly amplified by the transformer 320, as shown at G, for application to the cathode 334 of the magnetron 335. There finally appears, as the output of the magnetron 335, the powerful pulses of radio-frequency energy shown at H.

This completes the description of the transmitter equipment of the present invention and we turn, now, to the receiver equipment.

As shown in Fig. 12, the pulse-position-modulated output of the transmitting equipment is received by an antenna 338 and applied to any suitable pulse receiver 339. The output of the latter generally includes considerable noise which interferes with a clear reading of the desired signals. In order to avoid this disadvantage, the receiver output is fed to a noise suppressor 340 designed to pass only portions of those signals whose amplitudes are in excess of that of the noise. The noise suppressor also incorporates various sharpening circuits whereby the signals applied thereto are trimmed to a width suitable for the uses to which they are subsequently to be put. Three outputs are obtained from the noise suppressor, one for application to the intensity grid of an indicating oscilloscope 341, and two for application to a frame sync signal separator 342, which is adapted to generate local frame sync signals in response to the characteristic frame sync signals originally transmitted. The circuit includes two channels, one of which incorporates a delay line which delays the signals applied thereto for 8 microseconds, the delay between the characteristic frame sync signals originally transmitted. The outputs of the two channels are combined in a coincidence circuit whereby the local frame sync signals are obtained.

These local frame sync signals, which are of the frame frequency, namely, 1390 cycles per second, are applied to a frequency converter and channel monitor 343 wherein two functions are performed.

The first is a reduction of the frequency of the local frame sync signals to 695 cycles per second, said signals of reduced frequency being applied to a channel sync oscillator 344, which is free running at the channel switching rate of 11,120 cycles per second, and which is adapted to be synchronized by the frame sync signals of said reduced frequency. Thus, the frequency ratio of the outputs of the channel sync oscillator 344 and the frame sync separator 342 is 16 to 1, and, in order to assure a proper phase relationship between these outputs, a portion of the frame sync separator output is fed, through a switch 345, to the sweep circuit of a phase lock monitoring oscilloscope 346 to trigger said sweep circuit for the generation of a horizontal sweep having a length of somewhat less than that of a single channel, for example, about 15 microseconds. A portion of the output of the channel sync oscillator 344 is applied to the vertical deflecting plates of said monitoring oscilloscope 346. Thus, every 8th cycle of the channel sync oscillator may be observed on the monitoring oscilloscope.

Now, because the channel sync oscillator is synchronized only once every 16 cycles, every 16th cycle of the oscillator output is locked, but every 8th cycle is unlocked. Hence, if the frame sync separator and channel sync oscillator outputs are in proper phase relationship, the trace of every 8th cycle is coincident with the trace of every 16th cycle, but, if the oscillator is drifting, the observed signals will be displaced and suitable adjustment must be made to restore the proper phase relationship.

However, even where the outputs of the channel sync oscillator 344 and the frame sync separator 342 bear the proper relative phase relationship, there is still no assurance that the frequency ratio between the outputs of these components is 8 to 1, which is the ratio fixed at the transmitting end of the system. For example, suppose the channel sync oscillator 344 drifts to the extent that it generates 18 or 14 or any other even number of cycles for each synchronizing signal applied thereto from the frequency converter 343. Under such circumstances, the monitoring oscilloscope 346 would still show every 9th or 7th cycle, as the case may be, coincident with every 18th or 14th cycle, indicating a proper phase relationship, but the frequency ratio would obviously not agree with that of the transmitter.

In order to check the frequency ratio and permit correction if it is wrong, the second of the two previously mentioned functions of the frequency converter and channel monitor 343 is resorted to.

A portion of the output of the channel sync oscillator 344 is applied to the channel monitor circuit 343 to step charge a capacitor and cause the electron beam of an oscilloscope incorporated in said circuit to assume a different position for each charging impulse. A portion of the output of the frame sync separator 342 is also applied to the channel monitor circuit to discharge said capacitor at a time corresponding to every 8th charging pulse. If, therefore, the channel sync oscillator is, in fact, generating 8 cycles for every 1 of the frame sync separator, the screen of the oscilloscope will show 8 spots, but, if the frequency ratio is other than 8 to 1, a different number of spots will be observed.

Thus, between the operation of the phase lock monitor 346 and the channel monitor 343, proper functioning of the channel sync oscillator 344 is assured.

The channel sync signals from the oscillator 344 are utilized to trigger the sweep circuit of the indicating oscilloscope 341, the sweep thereby generated being somewhat longer than the channel width of 20 microseconds, for example, 21 microseconds. However, the oscilloscope beam is normally suppressed, except that another portion of the output of the oscillator 344 intensity modulates said beam at the commencement of the sweep, thereby producing a spot on the oscilloscope screen at a time corresponding to the commencement of said sweep. A further portion of the output of the oscillator 344 is applied to a marker 347, which may take the form of a conventional delay line, the output of which is likewise applied to the control grid of the indicator 341 to produce another spot on the indicator screen at a time corresponding to the end of the channel, in the system being described, 20 microseconds after the commencement of the indicating sweep. A still further portion of the output of the oscillator 344 is applied to a gating circuit 348 which, actually, is incorporated in the indicator 341, and which conditions the indicator to show the signals applied thereto only during the 20 microseconds of each channel.

As stated in earlier portions of this specification, the video output of the noise suppressor 340 is applied to the control grid of the indicator 341 whereby the intelligence-conveying signals of each channel are displayed on the indicator screen during successive sweeps. Finally, at regular intervals, for example, once per second, the indicator beam is intensified over a time interval covering a plurality of sweeps by a timer 349 to permit time synchronization of the permanent record to be made of the indicator display. Said permanent record is made by a motion picture camera 350 which faces the indicator screen and in which the film is moved continuously.

For a better understanding of the operation of the receiving end of the system, reference is now made to Fig. 13 of the drawings.

At A, a typical appearance of the oscilloscope screen at a given instant is shown. In the interest of simplicity, only three intelligence signals have been shown rather than the seven that are actually included in the system under consideration. At the extreme left, there is observed a spot labeled "Sync Signal." This corresponds to the output of the channel, sync oscillator 344. It is, in other words, the indication of the channel sync signals. At the extreme right, there is observed another spot labeled "20 μ sec. Marker." This corresponds to the output of the marker 347 under the control of the channel sync signals of the oscillator 344, and indicates the end of each channel. Between these spots, three additional spots are observed labeled, respectively, "3," "1" and "5". These correspond to intelligence-conveying signals in the third, first and fifth channels of the output of the noise suppressor 340. The signal labeled "1" is actually in the center of the channel, indicating that the pick-up and amplifier 123 (Fig. 1), which controls the first channel premodulator 115, is feeding only its unmodulated output to said premodulator. The signals labeled "3" and "5" are near the left and right ends, respectively, of their channels, indicating that the pick-ups and amplifiers 125 and 127 (Fig. 1) which control the third and fifth channel premodulators 109 and 111, are feeding modulated outputs to said premodulators, the former, an output of lesser amplitude than the normal, unmodulated amplitude, and the latter, an output of greater amplitude than the normal, unmodulated amplitude.

At B in Fig. 13, a typical appearance of the indicator screen at some time later is shown. The sync and 20 micro-second marker signals are, of course, in the same positions as before, but the intelligence-conveying signals have changed their positions, indicating different outputs from the pick-ups and amplifiers 123, 125 and 127 than had previously been the case.

Now, if a motion picture film is exposed and continuously moved during the time intervening the instants shown at A and B, said film might have the appearance shown at C, the successive spots appearing on the indicator screen causing the moving film to acquire the continuous traces shown thereon.

Actually, the operation of the trace interrupters 130 to 136, inclusive (Fig. 1), causes gaps to appear in the film traces, and the timer 349 (Fig. 12) causes transverse lines periodically to appear upon the film, and, with these additional indicia, the film appears as shown in Fig. 14.

While not limited thereto, Figs. 15 to 19B, inclusive, show circuits which may be employed in some of the components shown in Fig. 12. For example, Fig. 15 shows a specific form which the noise suppressor 340 may take. As there shown, the output from the receiver 339 is limited by application, across a grounded resistor 351 and through a coupling capacitor 352, to the control grid 353 of a pentode vacuum tube 354. The cathode 355 of said tube is grounded, and the anode 356 thereof is connected through a resistor 357 to the positive terminal of a power supply 358 having its negative terminal grounded. The screen grid 359 of the tube 354 is connected through a resistor 360 to the power supply 358 and through a resistor 361 to ground, and the suppressor grid 362 is conventionally tied to the cathode. The resistors 360 and 361 are by-passed to ground by a capacitor 363. The control grid 353 is returned to ground through a resistor 364, a potentiometer 365, a second resistor 366, and a negative bias supply 367, said bias supply, the resistor 366 and the effective portion of the potentiometer 365 being by-passed to ground by a capacitor 368.

The bias on the tube 354 is such that said tube is normally beyond cut-off by an amount in excess of the amplitude of the noise applied thereto from the receiver 339, whereby only signals having amplitudes greater than that of said noise are passed thereby.

The anode output of the tube 354 is coupled, through a capacitor 369 and across a resistor 370, to the control grid 371 of a pentode vacuum tube 372. The cathode 373 of said tube is grounded directly, the anode 374 thereof is connected through a parallel resistor network 375 to the power supply 358, the screen grid 376 thereof is connected through a parallel resistor network 377 to said power supply, and the suppressor grid 378 thereof is tied to the cathode. The tube 382 is unbiased, whereby it is driven to saturation to obtain an equal-amplitude output.

The anode output of the tube 372 is amplified by being coupled, through a capacitor 379 and across a resistor 380, to the control grid 381 of a pentode vacuum tube 382. The cathode 383 of said tube is connected to ground through a biasing resistor 384 which is by-passed by a capacitor 385, the cathode end of said resistor 384 being connected through another resistor 386 to the power supply 358. The anode 387 of said tube 382 is connected through a resistor 388 to the power supply 358, and the screen grid 389 is connected to the junction of a pair of resistors 390 and 391, in turn, connected, in series, across said power supply, said resistors being by-passed to ground by a capacitor 392. The suppressor grid 393 is connected to the junction of the resistors 384 and 386 and thus to the cathode 383.

The anode output of the tube 382 is further amplified and peaked by application, through a coupling capacitor 394 and across a resistor 395, to the control grid 396 of a pentode vacuum tube 397 which is normally operated at saturation. The cathode 398 of said tube is grounded directly, and the anode 399 thereof is connected through a parallel resistor network 400 and a peaking inductor 401 to the power supply 358. The screen grid 402 of said tube is connected through a parallel resistor network 403 to the power supply 358, said network being by-passed to ground through a capacitor 404, and the suppressor grid 405 is tied to the cathode 398.

At this point in the circuit, the pulse width, preferably, is about .5 microsecond, which is suitable for application to the frame sync separator 342 (Fig. 12) for generation of the frame sync signals, and, for this purpose, the anode output of the tube 397 is applied, through a coupling capacitor 406 and across a pair of potentiometers 407 and 408 in parallel, to the control grids 409 and 410 of a pair of pentode vacuum tubes 411 and 412 connected as cathode followers. The ends of the potentiometers 407 and 408 remote from the capacitor 406 are connected through a biasing resistor 413 to ground, said resistor being, in turn, connected across a current-limiting resistor 414 and a negative bias supply 415, the positive terminal of said bias supply being grounded. The resistor 413 is by-passed to ground by a capacitor 416. The cathode 417 and 418 of the tubes 411 and 412 are connected to ground, respectively, through load resistors 419 and 420, and the anodes 421 and 422 of said tubes are connected directly to the power supply 358. The screen grids 423 and 424 of the tubes 411 and 412 are connected to the power supply 358, respectively, through resistors 425 and 426, and the suppressor grids 427 and 428 are directly grounded.

As previously indicated, the frame sync separator 342 (Fig. 12) has two channels, one undelayed and the other delayed for a time equal to the spacing between the characteristic frame sync signals originally transmitted, in other words, 8 microseconds. The cathode output of the tube 411 is applied to the undelayed channel of the frame sync separator and the cathode output of the tube 412 is applied to the delayed channel of said separator.

It was also previously indicated that the width of the pulse output obtained at the anode of the tube 397 is satisfactory for application to the frame sync separator if it is about .5 microsecond. However, this pulse width is too great for application to the indicator 341 (Fig. 12) if adequate resolution is to be obtained. This width must be considerably reduced, and, for this purpose, a portion of the anode output of the tube 397 is differentiated across a network including the series-connected capacitor 429 and resistor 430. The resistor output of this network has its positive-going portion amplified and its negative-going portion clipped by application to the control grid 431 of a negatively biased pentode vacuum tube 432. The cathode 433 of said tube is grounded through a biasing resistor 434 which is by-passed by a capacitor 435, and the anode 436 thereof is connected through a resistor 437 to the power supply 358. The screen grid 438 is connected to the junction of a pair of resistors 439 and 440, in turn, connected across the power supply 358, said resistors being by-passed to ground by a capacitor 441, and the suppressor grid 442 is connected to the junction of the resistor 434 with another resistor 443, in turn, connected to said power supply 358. In this way the suppressor grid is connected directly to the cathode 433.

The anode output of the tube 432 is further sharpened by a second differentiation across a network including a capacitor 444 and resistor 445. The resistor output of this network has its negative-going portion amplified and its positive-going portion clipped by application to the control grid 446 of a pentode vacuum tube 447 operated at saturation. The cathode 447' of said tube is grounded directly, and the anode 448 thereof is connected through a parallel resistor network 449 and a peaking inductor 450 to the power supply 358. The screen grid 451 of said tube is connected through a parallel resistor network 452 to the power supply 358, said resistor being by-passed to ground by a capacitor 453, and the suppressor grid 454 is tied to the cathode 447'.

At the anode 448 of the tube 447 the pulse width is, preferably, about .15 microsecond, which is satisfactory for application to the indicator 341 (Fig. 12), and, for the latter purpose, said output is applied, through a coupling capacitor 455 and across a resistor 456 which is connected to the negative end of the biasing resistor 413, to the control grid 457 of a pentode vacuum tube 458 operated as a cathode follower. The cathode 459 of said tube is connected to ground through a load resistor 460, and the anode 461 thereof is connected directly to the power supply 358. The screen grid 462 is connected through a resistor 463 to said power supply 358, and the suppressor grid 464 is directly grounded. The cathode output of the tube 458, which is the video output of the receiving system, is applied to the intensity grid of the indicating oscilloscope 341 (Fig. 12).

Figure 20:
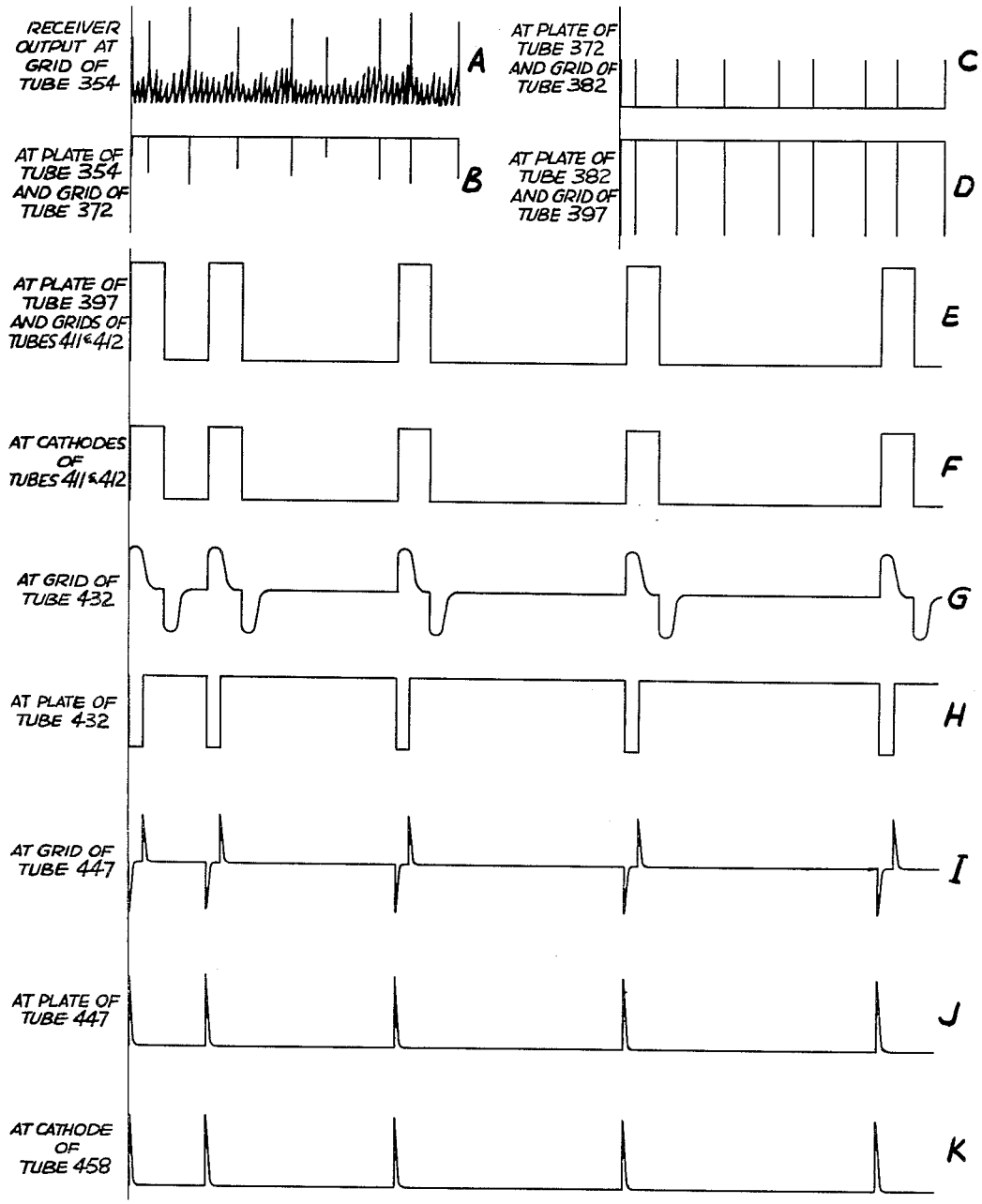

For a better understanding of the operation of the noise suppressor just described, reference is made to the wave shapes shown in Fig. 20 of the drawings.

At A in said figure, there is shown the output of the receiver 339 (Fig. 12) which is applied to the control grid of the tube 354. The output shown constitutes one entire frame of 720 microseconds duration and includes a double-pulse characteristic frame sync signal at the left, followed by seven intelligence-conveying signals. It will be noted that the desired signals are riding on top of considerable noise which makes them difficult to read and causes them to be of unequal amplitudes. However, because the tube 354 is biased beyond cut-off by an amount in excess of the amplitude of the noise, the latter, together with the lower portions of the desired signals, are suppressed in said tube, and the output at the plate of said tube appears, reversed, as at B. The negative-going signals there shown, which are of unequal amplitudes, are applied to the control grid of the tube 372. This tube is unbiased and is adapted to be overdriven, whereby there is obtained at the plate thereof the equal-amplitude output shown at C. This output is amplified by the tube 382 to obtain the negative-going output shown at D. The latter is further amplified by the tube 397, which is operated at saturation, to obtain the positive-going output shown at E.

In order better to explain the subsequent functioning of the circuit, the showing at E includes only the first four signals of the frame, and these have been exaggerated in the interest of clarity. The pulses shown at E are, preferably, about .5 microsecond in width, and these pulses are applied, in parallel, to the control grids of the cathode followers 411 and 412 to obtain at each of the cathodes 419 and 420 an output such as is shown at F. These outputs are, as previously stated, applied to the frame sync separator 342 (Fig. 12) to obtain from the double-pulse characteristic frame sync signal a single-pulse local frame sync signal.

Now, also as previously stated, the .5 microsecond pulses obtained at the plate of the tube 397, and shown at E, are too wide for good resolution when applied to the indicator 341 (Fig. 12). Therefore, a portion of the output of the tube 397 is differentiated across the network including the capacitor 429 and resistor 430 to obtain, across said resistor 430, the sharpened pulses shown at G. The latter are applied to the tube 432 which amplifies and squares the positive-going pulses and clips the negative-going pulses, resulting in the plate output shown at H. These signals are further differentiated across the network including the capacitor 444 and resistor 445, the resistor output of this network consisting of the very sharp pulses shown at I. The negative-going pulses of the latter are amplified and the positive-going pulses thereof are clipped by the tube 447, which is operated at saturation, to obtain the positive-going output shown at J. These signals are applied to the cathode follower 458 to obtain the final output shown at K which is, preferably, of a width of about .15 microsecond, suitable for application to the intensity grid of the indicator 341 (Fig. 12).

Figure 16:
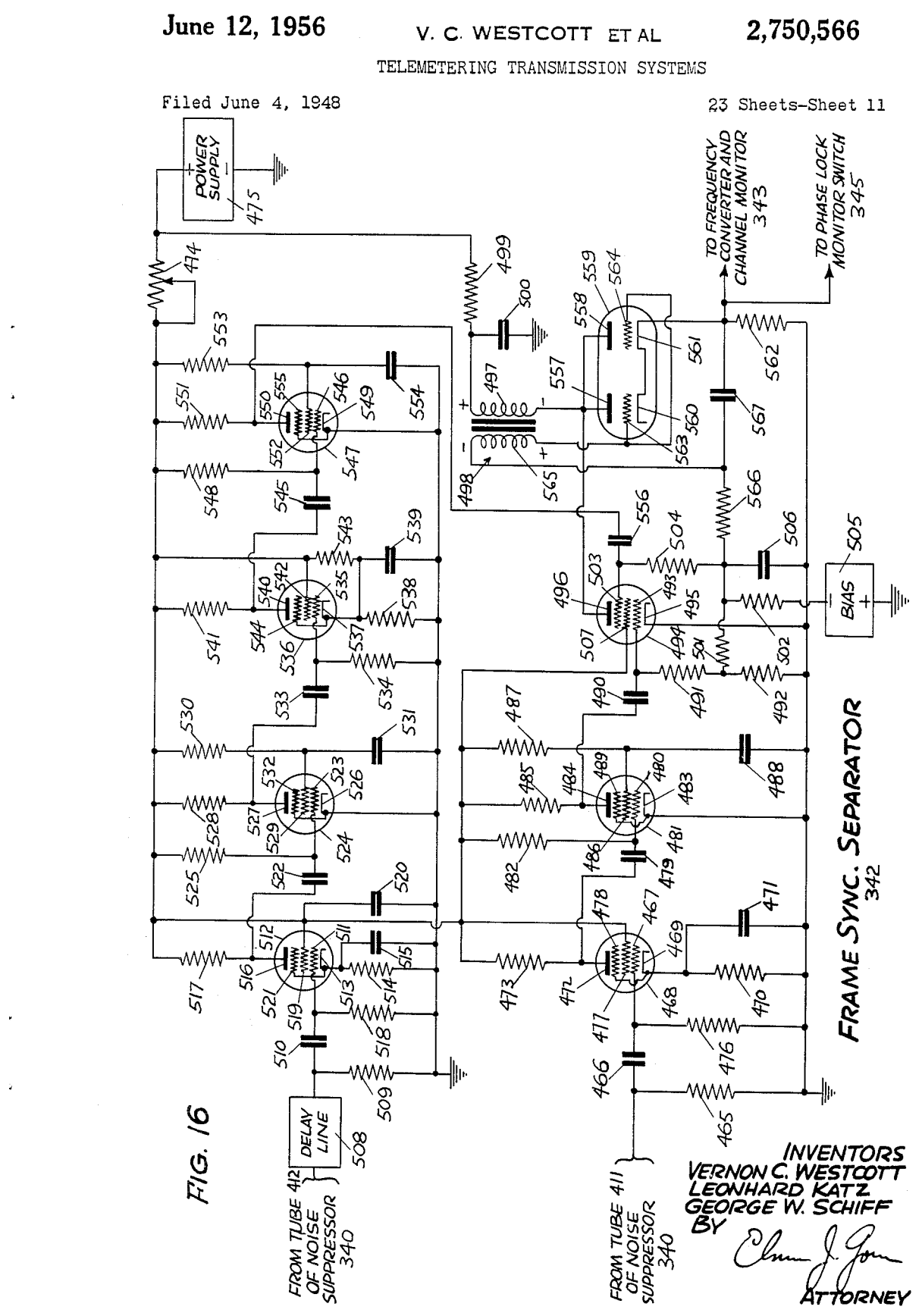

Reference is now made to Fig. 16 for a description of one form of circuit which may be utilized for the frame sync separator 342 (Fig. 12).

As there shown, that portion of the output of the noise suppressor 340 which comes from the tube 411 is applied, across a grounded resistor 465 and through a capacitor 466, to the control grid 467 of a pentode vacuum tube 468 connected as an amplifier. The cathode 469 of said tube is connected to ground through a biasing resistor 470 which is by-passed by a capacitor 471, and the anode 472 thereof is connected through a resistor 473 and potentiometer 474 to the positive terminal of a power supply 475 which has its negative terminal grounded. The control grid 467 is returned to ground through a resistor 476, the screen grid 477 is connected through the potentiometer 474 to the power supply 475, and the suppressor grid 478 is tied to the cathode.

The anode output of the tube 468 is coupled through a capacitor 479 to the control grid 480 of a pentode vacuum tube 481, said control grid being connected through a resistor 482 and the potentiometer 474 to the power supply 475, whereby said tube 481 functions as a limiter to assure uniform amplitude output. The cathode 483 is directly grounded, and the anode 484 is connected through a resistor 485 and the potentiometer 474 to the power supply 475. The screen grid 486 is connected, through a resistor 487 which is by-passed to ground through a capacitor 488, and the potentiometer 474, to the power supply 475, and the suppressor grid 489 is tied to the cathode.

The anode output of the tube 481 is coupled, through a capacitor 490 and across a pair of series-connected and grounded resistors 491 and 492, to the control grid 493 of a pentode vacuum tube 494 connected, as will later become apparent, as a coincidence tube. The cathode 495 of said tube is grounded directly, and the anode 496 thereof is connected through the primary winding 497 of a blocking oscillator transformer 498 and a resistor 499, to the power supply 475, said resistor 499 being by-passed to ground by a capacitor 500. The tube 494 is so biased below cut-off as to require coincidence of pulses applied thereto to render the same conducting. This is accomplished by connecting the junction of the resistors 491 and 492, through resistors 501 and 502, and the suppressor grid 503, through a resistor 504 and the resistor 502, to a negative bias supply 505 having its positive terminal grounded. The resistor 502 and the bias supply 505 are by-passed to ground by a capacitor 506. The control grid 493 is receptive of undelayed pulses, and the suppressor grid, as will shortly be described, is receptive of delayed pulses. The screen grid 507 is connected through the potentiometer 474 to the power supply 475.

That portion of the output of the noise suppressor 340 (Fig. 15) which comes from the tube 412 is applied through a delay line 508 adapted to delay the input thereto for a time corresponding to the interval between the double pulses of the characteristic frame sync signal, in the system being described, 8 microseconds, across a grounded resistor 509 and through a capacitor 510, to the control grid 511 of a pentode vacuum tube 512 connected as an amplifier. The cathode 513 of said tube is connected to ground through a biasing resistor 514 which is by-passed by a capacitor 515, and the anode 516 thereof is connected through a resistor 517 and the potentiometer 474 to the power supply 475. The control grid 511 is returned to ground through a resistor 518. The screen grid 519 is connected through the potentiometer 474 to the power supply 475 and to ground through a capacitor 520, and the suppressor grid 521 is tied to the cathode 513.

The anode output of the tube 512 is coupled through a capacitor 522 to the control grid 523 of a pentode vacuum tube 524, said control grid being connected through a resistor 525 and the potentiometer 474 to the power supply 475, whereby the tube 524 functions as a limiter to assure a uniform amplitude output. The cathode 526 of the tube 524 is directly grounded, and the anode 527 thereof is connected through a resistor 528 and the potentiometer 474 to the power supply 475. The screen grid 529 is connected through a resistor 530, which is by-passed to ground by a capacitor 531, and the potentiometer 474, to the power supply 475, and the suppressor grid 532 is tied to the cathode 526.

The anode output of the tube 524 is applied, through a capacitor 533 and across a resistor 534, to the control grid 535 of a pentode vacuum tube 536 connected to widen the pulses fed thereto so as to assure an overlapping of the pulses intended to coincide at the coincidence tube 494. The cathode 537 of the tube 536 is connected to ground through a biasing resistor 538 which is by-passed by a capacitor 539, and the anode 540 thereof is connected through a resistor 541 and the potentiometer 474 to the power supply 475. The screen grid 542 is connected through the potentiometer 474 to the power supply 475, and through a resistor 543 to the junction of the cathode 537 and resistor 538. The suppressor grid 544 is tied to the cathode.

The anode output of the tube 536 is coupled through a capacitor 545 to the control grid 546 of a pentode vacuum tube 547, said grid being connected through a resistor 548 and the potentiometer 474 to the power supply 475, whereby said tube 547 functions as a squarer-amplifier. The cathode 549 of said tube is directly grounded, and the anode 550 thereof is connected through a resistor 551 and the potentiometer 474 to the power supply 475. The screen grid 552 is connected through a resistor 553, which is by-passed to ground by a capacitor 554, and the potentiometer 474, to the power supply 475, and the suppressor grid 555 is tied to the cathode 549.

The anode output of the tube 547 is coupled through a capacitor 556 to the suppressor grid 503 of the coincidence tube 494.

As previously stated, the anode 496 of the tube 494 is connected through the primary winding 497 of the transformer 498, and the resistor 499, to the power supply 475. It is also connected to the anodes 557 and 558 of a duo-triode vacuum tube 559 adapted to function as a blocking oscillator tube. The cathodes 560 and 561 of said tube are tied together and connected to ground through a resistor 562. The control grids 563 and 564 of said tube are also tied together and connected through a secondary winding 565 of the transformer 498, a resistor 566, and the resistor 502 to the negative bias supply 505. The junction of the cathodes 560 and 561 with the resistor 562 is connected by a capacitor 567 to the junction of the secondary winding 565 with the resistor 566.

Figure 21:
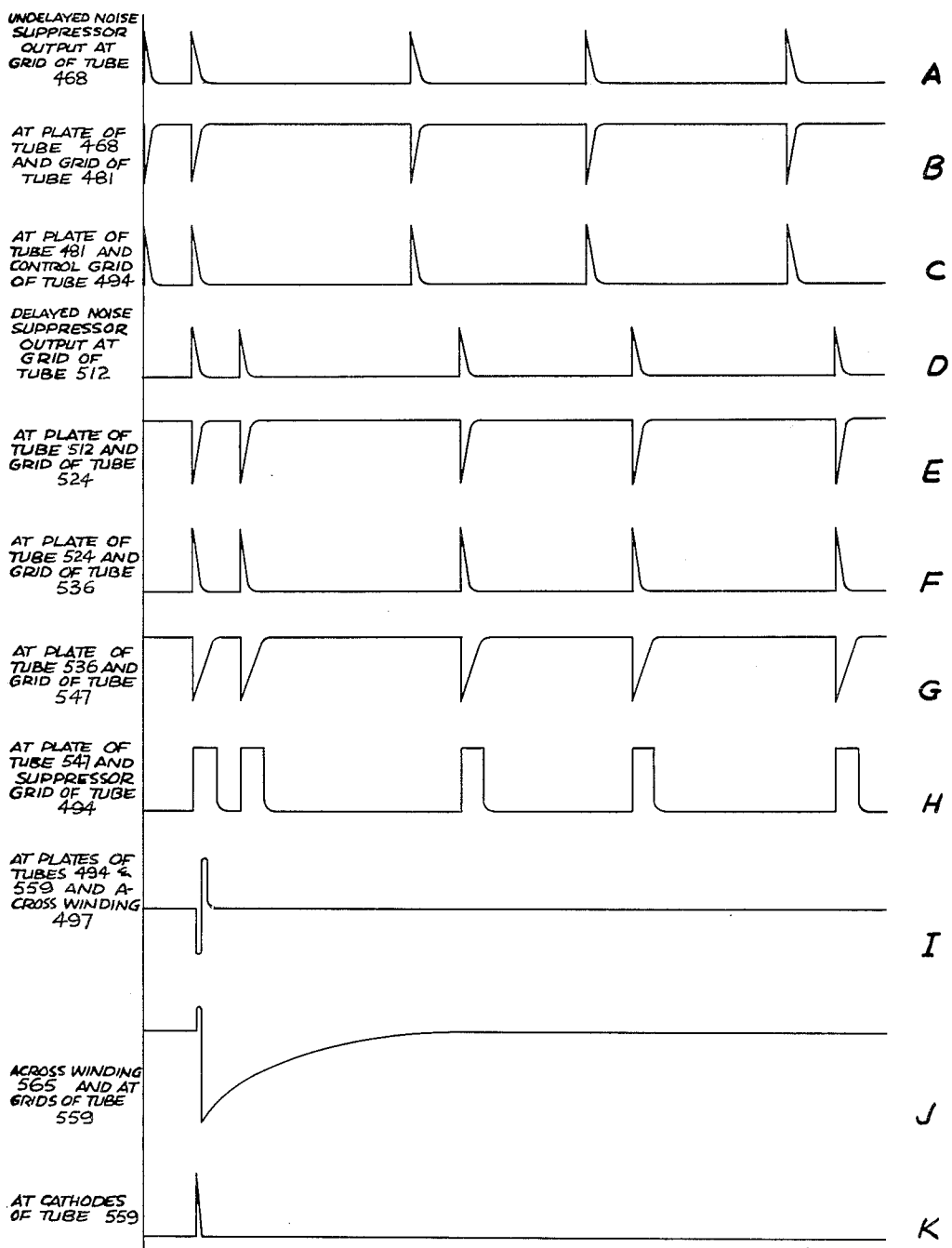

The operation of the circuit just described will best be understood with reference to Fig. 21.

At A in said figure, there is shown the undelayed output of the noise suppressor 340 (Fig. 12), the showing including, however, only the first four channels of a single frame. This output is applied to the tube 468 which amplifies it as shown at B. The latter is limited by the tube 481 to obtain the output shown at C. This output is applied to the control grid of the coincidence tube 494 which is so biased that this pulse input to the control grid thereof is alone insufficient to cause said tube to conduct.

Now, another portion of the output of the noise suppressor 340 is shown at D, and it will be noted that this output is similar to that shown at A except that, having been passed through the delay line 508, it occurs an amount of time later equal to the time between the double pulses of the characteristic frame sync signal originally transmitted. This delayed output is amplified, as shown at E, by the tube 512. The output of the latter is limited to produce the output shown at F. The tube 536 widens this output, as shown at G, and the latter is squared and amplified, as at H, by the tube 547. The pulses shown at H are applied to the suppressor grid of the coincidence tube 494.

It will be noted that the time of occurrence of the first of the characteristic frame sync pulses shown at H coincides with the time of occurrence of the second of the characteristic frame sync pulses shown at C. These coincident pulses are of sufficient amplitude to overcome the bias on the tube 494 whereby said tube conducts, this occurring at the beginning of each frame of eight channels.

The blocking oscillator 559 is biased so as normally to be non-conducting, but when the coincidence tube 494 conducts, the anodes 496, 557 and 558 follow the voltage form shown at I, as does the voltage across the primary winding 497 of the transformer 498, and this, through a reversal of polarity across the secondary winding 565, drives the grids 563 and 564 of the tube 559, as shown at J, and causes said tube to conduct. However, the positive-going portion of the wave shape shown at J causes the grids of the oscillator tube 559 to draw current and charge the capacitor 567 negatively, eventually blocking the tube. This negative charge slowly leaks off through the resistors 566, 501, 492 and 562. The result of the conducting condition of the tube 559 is a positive pulse output across the cathode resistor 562 thereof, as shown at K.

For a description of one form which the frequency-converter portion of the circuit 343 (Fig. 12) may take, reference is made to Fig. 17A.

As there shown, the frame sync signals constituting the output of the frame sync separator 342 (Fig. 12) are applied, across a resistor 568 and through a capacitor 569, to the control grid 570 of a triode vacuum tube 571, said tube being adapted to trigger a blocking oscillator generally designated by the reference character 572. The cathode 573 of the tube 571 is directly grounded, and the anode 574 thereof is connected, through a primary winding 575 of a transformer 576, and a resistor 577, to the positive terminal of a power supply 578, the negative terminal of which is grounded. The resistor 577 is by-passed to ground through a capacitor 579. The grid 570 is returned to ground through a pair of series-connected resistors 580 and 581, the latter being connected across a negative bias supply 582 and being by-passed to ground by a capacitor 583. The tube 571 is thereby biased so as to be normally non-conducting.

Coupled to the primary winding 575 of the transformer 576 is a secondary winding 584, said secondary winding being connected, at one end, to the control grid 585 of a triode vacuum tube 586 adapted to function as the oscillator tube of the blocking oscillator 572, and at the other end, in parallel, to a grounded capacitor 587, and, through a resistor 588 and two additional secondary windings 589 and 590, in series, to the grid 591 of another triode vacuum tube 592 connected as a cathode follower. The secondary windings 584, 589 and 590 are so wound as to reverse the polarity of the input to each. The cathode 593 of the oscillator tube 586 is directly grounded, and the anode 594 thereof is tied to the anode 574 of the trigger tube 571. The time constant of the blocking oscillator 572 is determined by the capacitor 587 and resistor 588.

The cathode follower 592 is maintained normally non-conducting by connecting the junction of the resistor 588 and secondary winding 590 to the negative bias supply 582. The cathode 595 of the tube 592 is connected to ground through a potentiometer 596, and the anode 597 thereof is connected through the resistor 577 to the power supply 578.

The cathode output of the tube 592 is applied, through a capacitor 598 and across a resistor 599, to the interconnected grid 600 and anode 601 of a triode vacuum tube 602, the cathode 603 of which is connected to ground through a capacitor 604, whereby the tube 602 functions as a diode and the capacitor 604 is adapted to be step-charged each time said tube 602 conducts. The junction of the cathode 603 and capacitor 604 is connected, in parallel, with the cathode 605 of a triode vacuum tube 606 having its grid 607 and anode 608 tied together and connected to ground through a resistor 609 whereby said tube functions as a diode, and, through a secondary winding 610 of a transformer 611, to the grid 612 of a triode vacuum tube 613 adapted to function as the oscillator tube of a second blocking oscillator, generally designated by the reference character 614.

The cathode 615 of the tube 613 is connected, through a resistor 616 and a potentiometer 617, to ground and, through a resistor 618 and a potentiometer 619, to the power supply 578, the junction of the resistors 616 and 618 also being connected to ground through a capacitor 620. The anode 621 of the tube 613 is connected through a primary winding 622 of the transformer 611 and a resistor 623, which is by-passed to ground by a capacitor 624, to the power supply 578. The winding 610 of the transformer 611 is wound to achieve positive feed back from the anode 621 to the grid 612 of the tube 613. The time constant of the blocking oscillator 614 is determined by the capacitor 604 and resistor 609, and the count-down rate of said oscillator is determined by the cathode bias selected by the potentiometers 617 and 619. In the system under consideration, this bias is set so that the tube 613 conducts once for every two pulses charging the capacitor 604.

The transformer 611 includes two additional secondary windings 625 and 626 connected in parallel and wound to reverse the output of the primary winding 622, said secondary windings being themselves connected in parallel with a resistor 627, potentiometer 628 and another resistor 629, all in series, whereby the blocking oscillator output is applied to the grid 630 of a triode vacuum tube 631 connected as a cathode follower.

The tube 631 is normally biased to cut-off by connecting the junction of the winding 626 and resistor 629 through another resistor 632, which is by-passed to ground by a capacitor 633, to the negative bias supply 582. The cathode 634 of the tube 631 is connected to one end of the series-connected primary windings 635 and 636 of an output transformer 637, the other end of said connected windings being grounded. The transformer 637 includes a pair of parallel-connected and grounded secondary windings 638 and 639 adapted to step down the voltage applied thereto and provide a final, positive-going output for synchronizing the channel sync oscillator 344 (Fig. 12).

Figure 22:
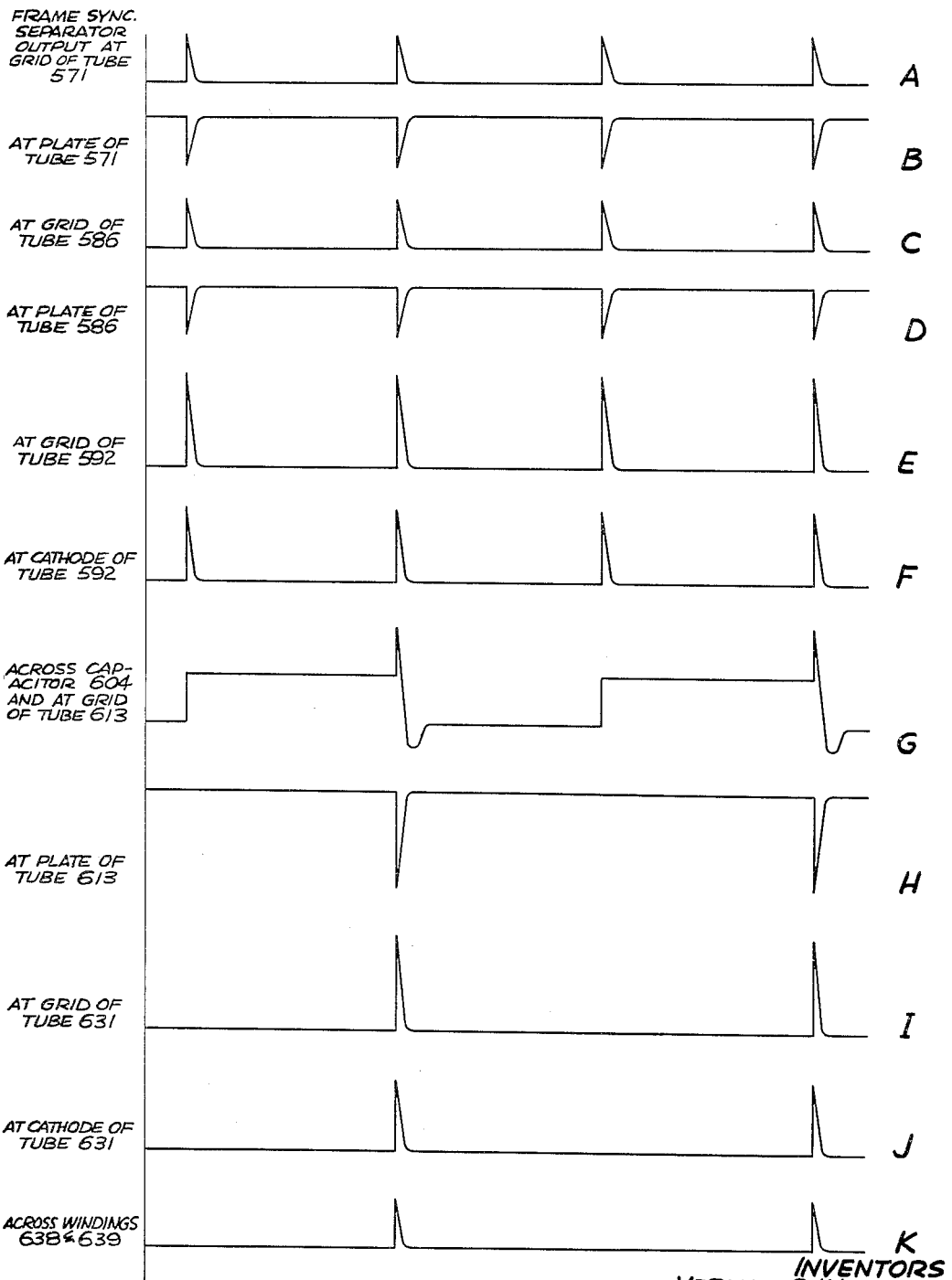

For a better understanding of the operation of the frequency-converter circuit just described, reference is made to Fig. 22 of the drawings.

At A in said figure, there is shown the frame sync signal output of the frame sync separator 342 (Fig. 12), the showing including four pulses at the frame frequency of 1390 cycles per second. These pulses are applied to the normally non-conducting trigger tube 571 to produce at the plate of said tube, and across the primary winding 575 of the transformer 576, the negative-going pulses shown at B. The latter are inverted by the secondary winding 584, as at C, and applied to the grid of the normally non-conducting oscillator tube 586 which is thereby triggered to produce at the plate thereof the negative-going pulses shown at D. These pulses add to the voltage across the winding 575, thereby driving the grid of the tube 586 still more positive. This process is cumulative until the capacitor 587 becomes charged sufficiently negative to render the tube 586 non-conducting, said negative charge eventually leaking off through the resistors 588 and 581. The combined outputs shown at B and D are inverted by the secondary windings 589 and 590, as shown at E, and are applied to the cathode follower 592. The cathode output of the tube 592, shown at F, is applied through the tube 602, to the capacitor 604, the voltage across said capacitor being as indicated at G.

Now, the oscillator tube 613 is normally biased beyond cutoff, the amplitude of the voltage across the capacitor 604 required to trigger said oscillator tube 613 being determined, as previously stated, by the setting of the potentiometers 617 and 619. Therefore, the latter elements constitute means for determining the count-down rate of the blocking oscillator 614 which includes said tube 613. Inasmuch as a frequency of 695 cycles per second is desired herein of the output of the frequency converter 343, tube 613 is biased so as to be triggered by every second pulse charging the capacitor 604. As each such second pulse charges the capacitor 604, the tube 613 conducts to provide at the plate thereof, and across the primary winding 622, the negative-going output of reduced frequency shown at H. The secondary winding 610 is wound, of course, to provide positive feed-back to drive the grid of the tube 613 more and more positive, the process being cumulative until the capacitor 604 discharges through the tube 613 and commences to charge with reversed polarity. When the reverse charge reaches a sufficient magnitude, the tube 613 is rendered non-conducting and the negative charge on the capacitor 604 leaks off through the tube 606.

The anode output of the tube 613 is inverted by the windings 625 and 626, as shown at I, and is applied to the cathode follower 631. The cathode output of the latter, shown at J, is stepped down across the secondary windings 638 and 639, as at K, and is utilized to synchronize the channel sync oscillator 344 (Fig. 12).

Reference is now made to Fig. 18 for a description of one form which said channel sync oscillator 344 may take.

As shown in said Fig. 18, the 695 cycles per second output of the frequency converter portion of the circuit 343 (Fig. 12) is applied, across a resistor 640, to the control grid 641 of a pentode vacuum tube 642 adapted to function as the synchronizing tube of a free-running blocking oscillator, generally designated by the reference character 643.

The cathode 644 of the tube 642 is connected to ground through a resistor 645 which is by-passed by a capacitor 646. Said cathode is also tied to the suppressor grid 647 which, in turn, is connected through a resistor 648 to the positive terminal of a power supply 649 having its negative terminal grounded. The anode 650 of the tube 642 is also connected to said power supply through the primary winding 651 of a transformer 652, and the screen grid 653 is, likewise, connected to said power supply through a resistor 654 which is by-passed to ground by a capacitor 655.

The transformer 652 includes a pair of series-connected secondary windings 656 and 657 which are connected, at one end, in parallel, with the control grids 658 and 659 of a pair of pentode vacuum tubes 660 and 661 adapted to function as the oscillator tubes of the blocking oscillator 643, and, at the other end, through a pair of resistors 662 and 663, to the adjustable arm of a potentiometer 664, the latter, in turn, being connected, in series with a resistor 665 and another potentiometer 666, across the power supply 649.

The junction of the winding 657 and resistor 662 is connected to ground through a capacitor 667, and the junction of the resistor 663 and the adjustable arm of the potentiometer 664 is connected to ground through a capacitor 668.

The junction of the winding 657 and the resistor 662 is also connected to the cathodes 669 and 670 of a duo-diode 671, the anodes 672 and 673 of which are grounded through a resistor 674, which is by-passed by a capacitor 675 and connected to a negative bias supply 676 having its positive terminal grounded.

The cathodes 677 and 678 of the tubes 660 and 661 are tied together and connected to ground through a resistor 679, and the anodes 680 and 681 of said tubes are, likewise, tied together and connected through a tertiary winding 682 of the transformer 652, and a resistor 683, to the power supply 649, the resistor 683 being by-passed to ground through a capacitor 684.

The screen grids 685 and 686 of the tubes 660 and 661 are connected, respectively, to the anodes 680 and 681, and the suppressor grids 687 and 688 are connected, respectively, to the cathodes 677 and 678.

The output of the circuit thus far described is taken from the anode 650 of the tube 642, as will later be described, and applied, through a capacitor 689 and across a resistor 690, to the control grid 691 of a pentode vacuum tube 692 connected as a cathode follower. The cathode 693 of said tube 692 is connected to ground through a resistor 694, and the anode 695 and screen grid 696 thereof are tied together and connected through a resistor 697, which is by-passed to ground by a capacitor 698, to the power supply 649, the suppressor grid 699 of said tube being tied to the cathode 693 thereof.

Three cathode outputs are taken from the tube 692, two of them being coupled, through a capacitor 700, respectively, to the intensity grid of the indicator 341 and the vertical-deflecting plates of the phase lock monitor 646 (Fig. 12). These two outputs are high voltage and high impedance. The third output is applied through the capacitor 700 to the series-connected primary windings 701 and 702 of a step-down transformer 703 having parallel-connected secondary windings 704 and 705 adapted to feed a low-voltage, low-impedance output to the channel monitor portion of the circuit 343, and the marker 347 (Fig. 12).

Figure 23:
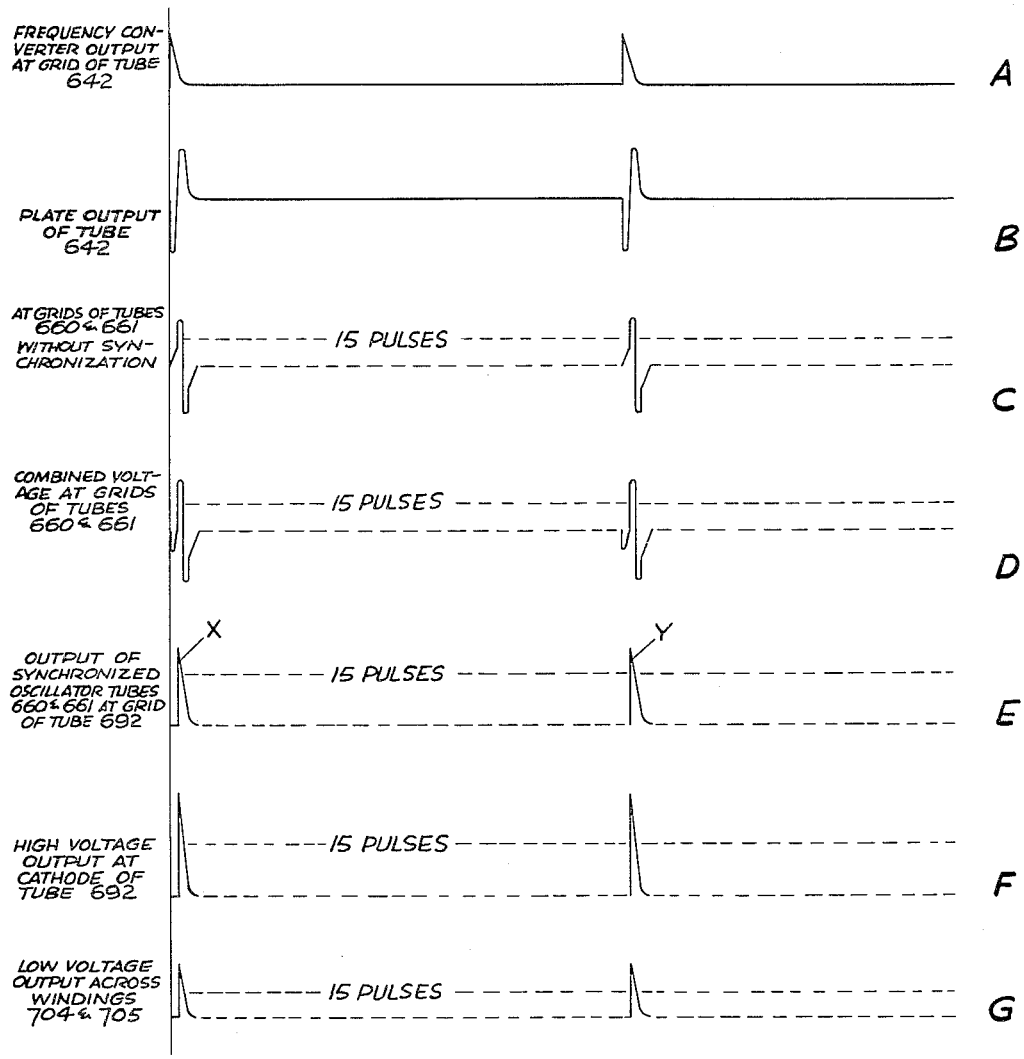

Reference is now made to Fig. 23 for an explanation of the operation of the channel sync oscillator just described.

At A, there is shown the frequency converter output of 695 cycles per second which is applied to the grid of the normally non-conducting synchronizing tube 642. As said tube conducts, the anode thereof first goes negative and then, due to the inductance of the primary winding 651 of the transformer 652, swings considerably positive, resulting in the wave form shown at B.

The voltage normally at the grids of the blocking oscillator tubes 660 and 661 is as shown at C in the absence of the synchronizing pulses of B, but, when the latter are combined with said normal voltage, the result is as shown at D. The broken lines in sub-divisions C to G of the figure merely indicate that the pulses are repeated. The combination just referred to occurs once for every 16 cycles of the blocking oscillator and therefore locks or synchronizes every 16th oscillator pulse.

The anode output of the tube 642 is reversed by the series-connected secondary windings 656 and 657 for application to the grids of the oscillator tubes 660 and 661, the plate outputs of said tubes 660 and 661 being fed back to the grids of said tubes by the coupling between the tertiary winding 682 and the secondary windings 656 and 657.

As the grids of the oscillator tubes 660 and 661 go positive, they draw current and charge the capacitor 667 whereby said tubes eventually block. The blocking charge leaks off through the resistors 662, 663 and 665, and the potentiometer 664. Any tendency for the capacitor 667 to charge to excess is eliminated by the biased duo-diode 671.

The blocking oscillator output, which is coupled from the tertiary winding 682 to the primary winding 651, is as shown at E, wherein the pulses X and Y are locked and the 15 pulses therebetween are free-running. This output is applied to the grid of the self-biasing cathode follower 692 to obtain at the cathode thereof the output shown at F. This output, which is of high voltage and high impedance, is applied to the indicator 341 and phase lock monitor 346 (Fig. 12). It is also applied to the stepdown transformer 703 to obtain the low voltage, low impedance output shown at G, the latter being fed to the channel monitor portion of the circuit 343 and, also, to the marker 347 (Fig. 12).

For a description of one form of circuit which may be employed for the channel monitor, reference is made to Fig. 17B.

As there shown, the low voltage, low impedance channel sync signals from the oscillator 344 (Fig. 12) are applied across the parallel-connected primary windings 706 and 707 of a transformer 708, said transformer including series-connected secondary windings 709 and 710, one end of which is grounded through a potentiometer 711 and the other end of which is coupled through a capacitor 712 to the control grid 713 of a triode vacuum tube 714 connected as a boot-strap amplifier. The cathode 715 of said tube is connected to the junction of the winding 710 and resistor 711, and the anode 716 thereof is connected to the positive terminal of a power supply 717 having its negative terminal grounded. The tube 714 is biased to cut-off by connecting the grid 713 thereof through a resistor 718 to the negative terminal of a bias supply 719 having its positive terminal grounded.

The cathode output of the tube 714 is applied to the anode 720 of a diode vacuum tube 721, the cathode 722 of said tube being connected to ground through a capacitor 723 whereby the latter is adapted to be stepped-charged each time the tube 721 conducts.

The cathode side of the capacitor 723 is connected through a coupling capacitor 724 to one of the vertical deflecting plates 725 in parallel with one of the horizontal deflecting plates 726 of a cathode-ray tube 727. The junction of the plates 725 and 726 is connected through a resistor 728 to the adjustable arm of a potentiometer 729 which, in series with a plurality of resistors 730, 731, 732 and 733, and two additional potentiometers 734 and 735, are connected across the power supply 717. The remaining vertical deflecting plate 736 and the remaining horizontal deflecting plate 737 of the cathode-ray tube 727 are grounded. The junction of the resistor 731 and potentiometer 734 is connected to a negative bias supply 738 having its positive terminal grounded.

The cathode-ray tube 727 includes a cathode 739 which is connected to the junction of the resistor 732 and potentiometer 734, a first grid 740 which is connected to the adjustable arm of said potentiometer 734, a second grid 741 which is connected to the adjustable arm of the potentiometer 735, and a third grid 742 which is grounded.

The deflecting plates 725 and 726 are so biased by the bias supply 738 that, in the absence of any voltage across the capacitor 723, the electron beam of the tube 727 is off the screen thereof.

Now, each time the tube 714 conducts, the cathode 715 thereof goes positive, whereby the diode tube 721 conducts to charge the capacitor 723. This causes the deflecting plates 725 and 726 of the cathode-ray tube 727 to become more and more positive, whereby the electron beam of the tube 727 causes spots to appear along a diagonal line from the lower right-hand corner to the upper left-hand corner of the cathode-ray tube screen.

It will be recalled that the purpose of the monitor 343 is to check the frequency ratio between the channel sync oscillator 344 and the frame sync separator 342 (Fig. 12). For this purpose, a portion of the output of the frame sync separator is applied, through a rectifying crystal 743, across a resistor 744, and through a capacitor 745, to the control grid 746 of a gas-discharge tube 747 having its cathode 748 grounded directly, and its anode 749 connected to the hot side of the step-charging capacitor 723. The tube 747 is maintained normally non-conducting by connecting the control grid 746 thereof through a resistor 750 to the negative bias supply 719, but each pulse applied to said tube from the frame sync separator 342 renders said tube conducting to thereby discharge the capacitor 723. It will be seen, therefore, that, if the above referred to frequency ratio is correct, the discharging of the capacitor 723 should occur once for every eight charging impulses applied to said capacitor, and 8 diagonally arranged spots should appear on the screen of the cathode-ray tube 727.

Figure 24:
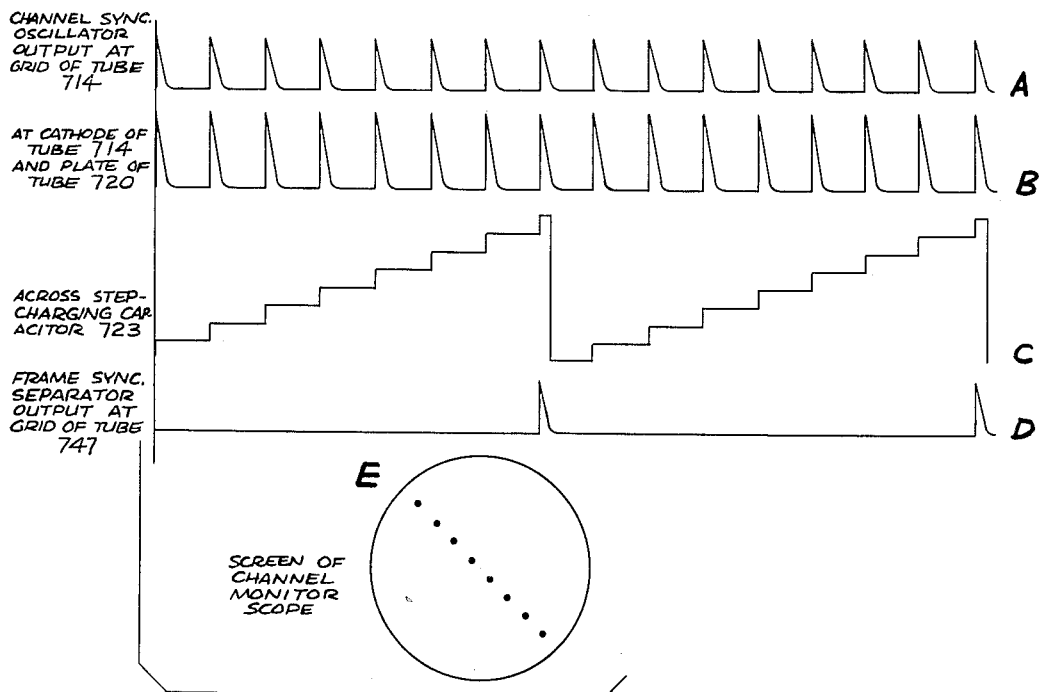

For a further understanding of the operation of the circuit just described, reference is made to Fig. 24.

At A in said figure, there is shown the 11,120 cycles per second channel sync signals generated by the oscillator 344 (Fig. 12). These signals are applied through the transformer 708 to the control grid of the normally non-conducting tube 714. Inasmuch as this tube is connected as a boot-strap amplifier, there appears at the cathode thereof the amplified output shown at B. Each pulse of this output renders the diode 721 conducting whereby the capacitor 723 becomes stepped charged as shown at C.

Now, a portion of the output of the frame sync separator 342, which is at the frame frequency of 1390 cycles per second, ⅛ of the channel switching rate, as can be seen at D, is applied to the control grid of the normally non-conducting, gas-discharge tube 747. The anode voltage on said tube is supplied from the step-charging capacitor 723. Each time the tube 747 conducts, the capacitor 723 discharges therethrough. This removes the anode voltage from said tube and permits said tube to extinguish.

The charging and discharging of the capacitor 723 not only supplies and removes the anode voltage of the tube 747, but it also performs the following function.

As previously stated, the deflecting plates 725 and 726 of the cathode-ray tube 727 are normally biased whereby the electron beam of said tube is prevented from striking the screen thereof. However, the charging of the capacitor 723 causes said beam to move diagonally across said screen in discrete jumps corresponding to the increments of voltage sequentially built up across the capacitor by each charging impulse. As soon as 8 spots appear on the screen, the capacitor 723 discharges and the cycle commences over again. Of course, this is only so if the frequence ratio between the oscillator 344 and frame sync separator 342 is the desired frequency ratio, herein, 8 to 1.

Figure 25:
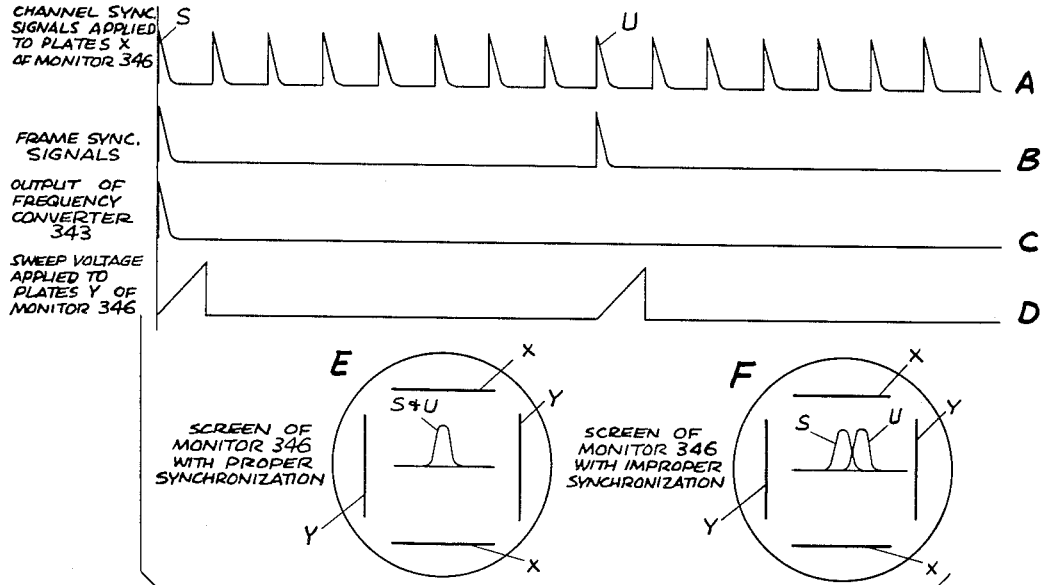

At this point in the description of the monitoring facilities of the system being described, it is deemed appropriate further to explain the cooperation between the functions of the channel monitor 343 and the phase lock monitor 346 (Fig. 12), and, for this purpose, reference is made to Fig. 25.

The channel sync oscillator 344 is a free-running oscillator which is synchronized by signals derived from the frame sync separator 342, and any tendency of the oscillator 344 to drift between synchronizing pulses, which would upset the proper phase relationship between the channel sync signals and the frame sync signals, must be checked. This is done in the system herein by comparing a locked pulse from the oscillator 344 with one that is unlocked.

At A in Fig. 25, there is shown 16 channel sync signals from the oscillator 344. At B in said figure, there is shown two frame sync signals from the frame sync separator 342, the frequency ratio between the signals at A and B being 8 to 1. The frame sync signals are reduced in frequency by the frequency converter 343 to 695 cycles per second to obtain the output shown at C. The frequency ratio, therefore, between the pulses at A and C is 16 to 1. Hence, the first pulse shown at A, marked S, is a synchronized or locked pulse, but the ninth pulse shown at A, marked U, is a free-running or unlocked pulse. These are the pulses whose phases are to be specifically compared.

Now, the frame sync signals shown at B are utilized to trigger the sweep circuit (not shown) of the phase lock monitor oscilloscope 346 (Fig. 12) to produce the short sweep shown at D (of a duration less than 20 microseconds, the width of a single channel herein), which is applied to the horizontal deflecting plates Y of said monitor oscilloscope (see E and F). The channel sync signals shown at A are applied to the vertical deflecting plates X of said oscilloscope. However, because the sweep repetition frequency of said oscilloscope, which is fixed by the signals B, is ⅛ the channel sync signal frequency, only every 8th channel sync signal will be observed on the screen of said oscilloscope, more particularly, the signals marked S and U at A. If the oscillator 344 is functioning properly and there is no drift, the signals S and U will be superimposed as shown at E, but, if there is drift, these signals will be relatively displaced and will appear as shown at F.

Thus, the phase lock monitor 346 checks the phase relationship between the channel sync oscillator 344 and the frame sync separator 342, and the channel monitor 343 checks the frequency ratio between these components.

Figure 19A:
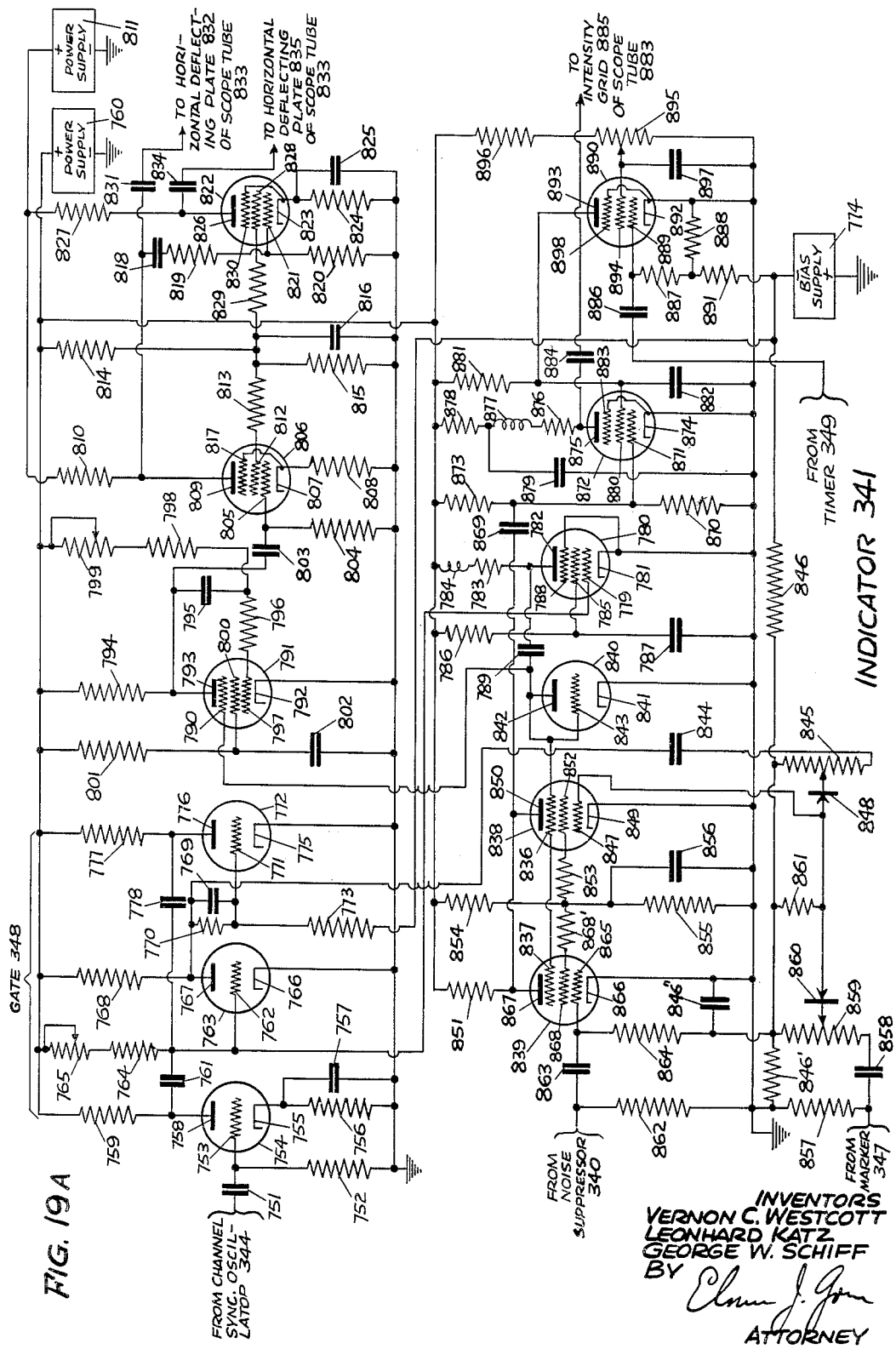
Figure 19B:
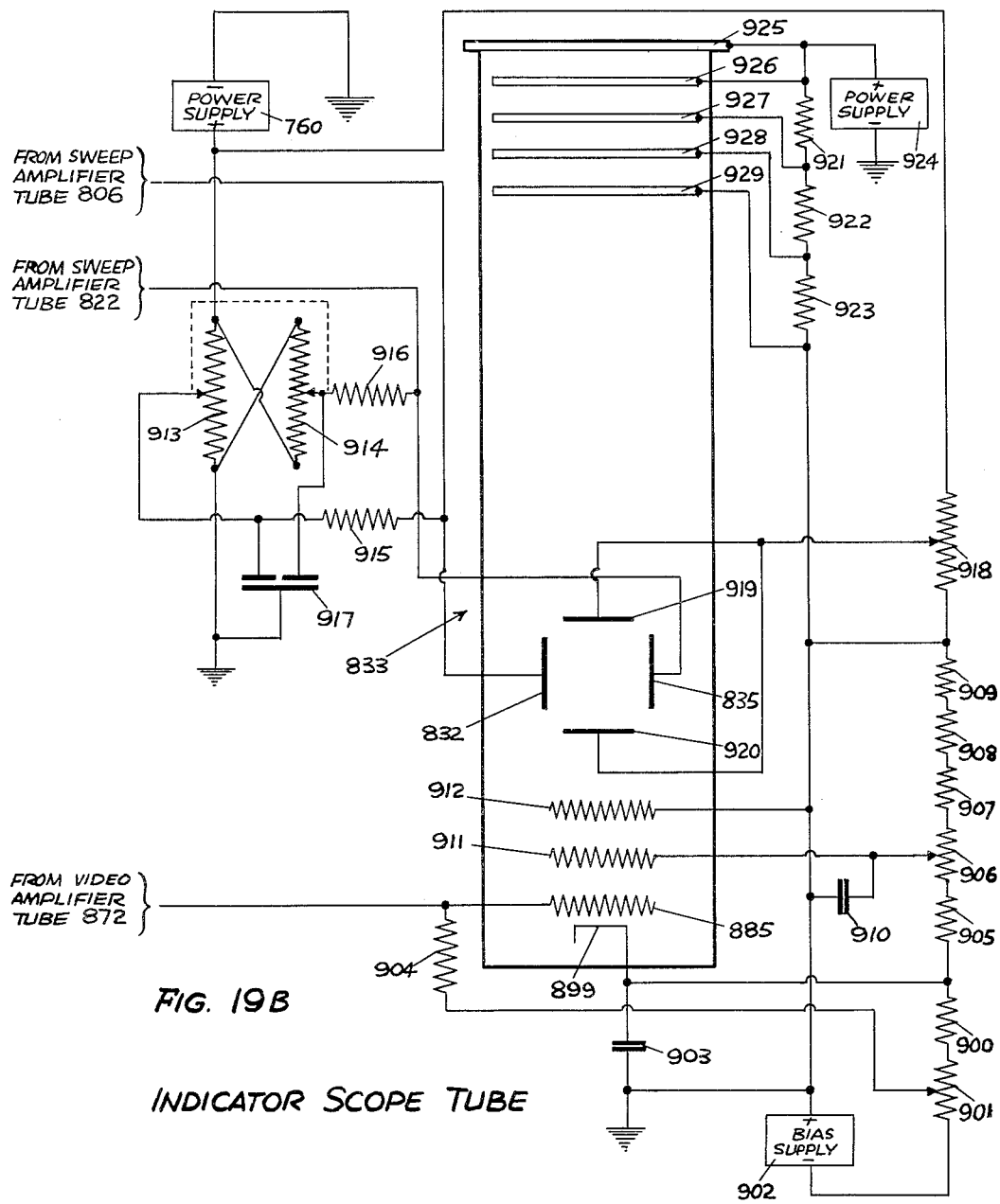

For a description of one form which the indicator 341 may take, reference is now made to Figs. 19A and 19B.

As there shown, a portion of the output of the channel sync oscillator 344 (Fig. 12) is applied, through a capacitor 751 and across a grounded resistor 752, to the control grid 753 of a triode vacuum tube 754. The cathode 755 of said tube is grounded through a biasing resistor 756 which is by-passed by a capacitor 757, and the anode 758 thereof is connected through a resistor 759 to the positive terminal of a power supply 760 having its negative terminal grounded.

The anode output of the tube 754 is applied through a capacitor 761 to the control grid 762 of a triode vacuum tube 763, said grid being held near ground potential by connecting the same through a resistor 764 and potentiometer 765 to the power supply 760. Due to the current drawn by the grid 762 the above result follows. The cathode 766 of the tube is grounded directly, and the anode 767 is connected through a resistor 768 to said power supply 760.

The anode output of the tube 763 is applied, through a capacitor 769 and resistor 770 in parallel, to the control grid 771 of a triode vacuum tube 772, said tube being normally held below cut-off by further connecting said grid through a resistor 773 to a negative bias supply 774 having its positive terminal grounded. The cathode 775 of the tube 772 is grounded directly, and the anode 776 thereof is connected, through a resistor 777, to the power supply 760, and through a capacitor 778, to the control grid 762 of the tube 763.

It will be recalled from the description of the operation of the receiving system shown in the block diagram of Fig. 12 that the input to the indicator 341 is so controlled by the gate 348 that only those signals occurring during the 20 microseconds of each channel can appear upon the screen of said indicator. In said Fig. 12, the gate 348 is shown as a separate component in order to aid in an understanding of the system as a whole, but actually said gate is incorporated in the indicator and consists, specifically, of the tubes 754, 763 and 772, together with their associated circuit connections just described.

Two outputs are taken from the gate 348, one from the grid of the tube 763 and the other from the anode of said tube.

The grid output is applied to the control grid 779 of a pentode vacuum tube 780 and the cathode 781 of which is grounded directly, and the anode 782 of which is connected through a resistor 783 and inductor 784 to the power supply 760. The screen grid 785 is connected through a resistor 786, which is by-passed to ground by a capacitor 787, to the power supply 760, and the suppressor grid 788 is tied to the cathode. The tube 780 functions as an amplifier and two outputs are taken therefrom, both from the anode thereof.

One of said outputs is utilized to trigger the sweep generator of the indicator scope tube later to be described, and, for this purpose, is applied through a capacitor 789 to the suppressor grid 790 of a pentode vacuum tube 791. The cathode 792 of said tube 791 is grounded directly, and the anode 793 thereof is connected, through a resistor 794, to the power supply 760, and through a capacitor 795 and resistor 796, to the control grid 797. The junction of the capacitor 795 and resistor 796 is connected through a resistor 798 and potentiometer 799 to the power supply 760, and the screen grid 800 is likewise connected through a resistor 801, which is by-passed to ground by a capacitor 802, to said power supply. The tube 791 functions as a saw-tooth sweep generator.

The anode output of the tube 791 is coupled, through a capacitor 803 and across a grounded resistor 804, to the control grid 805 of a pentode vacuum tube 806 which functions as half of a push-pull sweep amplifier. The cathode 807 of the tube 806 is connected to ground through a resistor 808, and the anode 809 thereof is connected through a resistor 810 to the positive terminal of a power supply 811 having its negative terminal grounded.

The power supply 811 is of greater voltage that the power supply 760. For example, the latter may be of about 300 volts, whereas the former is, preferably, of about 750 volts.

The screen grid 812 of the tube 806 is connected through a resistor 813 to the junction of a pair of resistors 814 and 815 connected, in series, across the power supply 760, the resistor 814 being by-passed to ground through a capacitor 816. The suppressor grid 817 is tied to the cathode 807.

The anode output of the tube 806 is coupled, through a capacitor 818 and resistor 819, and across a grounded resistor 820, to the control grid 821 of a pentode vacuum tube 822 adapted to function as the other half of the push-pull sweep amplifier above referred to. The cathode 823 of said tube is connected to ground through a resistor 824 which is by-passed by a capacitor 825, and the anode 826 thereof is connected through a resistor 827 to the power supply 811. The screen grid 828 is connected through a resistor 829 to the junction of the resistors 814 and 815, and the suppressor grid 830 is tied to the cathode 823.

The anode output of the tube 806, in addition to being fed to the input circuit of the tube 822, is applied through a capacitor 831 to one of the horizontal deflecting plates 832 (Fig. 19B) of a cathode-ray tube 833 later to be described in detail, and the anode output of said tube 822 is applied through a capacitor 834 to the other horizontal deflecting plate 835 of said cathode-ray tube.

The amplified gate from the tube 780, in addition to controlling the operation of the sweep generator tube 791, is applied through the capacitor 789 to the series-connected suppressor grids 836 and 837 of a pair of pentode vacuum tubes 838 and 839 to condition said tubes for the reception of additional signals as will later be explained. A clamping tube 840, having its cathode 841 grounded directly and its anode 842 and grid 843 tied together, is interposed between the coupling capacitor 789 and the suppressor grid 836.

It will be recalled that two outputs are taken from the gating tube 763, one from the grid and the other from the anode. The latter output is differentiated across a network including, in series, a capacitor 844 and potentiometer 845, said network being connected, in parallel, through a resistor 846, to the negative bias supply 774, and through a resistor 846', to ground. A portion of the output across the potentiometer 845, and the negative bias, are applied to the control grid 847 of the tube 838 by connecting the adjustable arm of said potentiometer through a rectifying crystal 848 to said control grid. The resistors 846 and 846', and the negative bias supply 774, are by-passed to ground by a capacitor 846''. The cathode 849 of the tube 838 is grounded directly, and the anode 850 thereof is connected through a resistor 851 to the power supply 760. The screen grid 852 of said tube is connected through a resistor 853 to the junction of a pair of resistors 854 and 855 which are connected, in turn, across the power supply 760, said resistor 854 being by-passed to ground by a capacitor 856. The tube 838 is normally considerably below cut-off, and the application thereto of the positive-going pulse resulting from the differentiation of the leading edge of the gate coincident with the conditioning of said tube by the application to the suppressor grid thereof of the gate itself produces at the anode 850 a sharp pulse at the commencement of each intelligence-conveying channel.

The output of the marker 347 (Fig. 12) is also applied to the control grid 847 of the tube 838 in order to obtain an indication of the end of each channel. For this purpose, said marker output is applied across a parallel network including, in one arm, a grounded resistor 857, and in the other arm, in series, a capacitor 858, potentiometer 859 and the grounded resistor 846', the adjustable arm of said potentiometer being connected through a rectifying crystal 860 to the control grid 847 of the tube 838. The junction of the ground ends of the potentiometers 845 and 859 is connected by a resistor 861 to the junction of the oppositely disposed crystals 848 and 860.

The video output from the noise suppressor 340 (Fig. 12) is applied to the tube 839. For this purpose, said video output is fed across a grounded resistor 862, through a capacitor 863, and across a resistor 864 which is connected to the junction of the resistors 846 and 846', to the control grid 865 of said tube 839. The cathode 866 of said tube is grounded directly, the anode 867 thereof is connected through the resistor 851 to the power supply 760, and the screen grid 868 is connected through a resistor 868' to the junction of the resistors 854 and 855. The tube 839 is normally well beyond cut-off but the application to the suppressor grid 837 thereof of the amplified gate from the tube 780 conditions said tube for passing to the anode thereof the intelligence-conveying pulses constituting the video output of the noise suppressor 340.

The combined anode outputs of the tubes 838 and 839 are applied, through a capacitor 869 and across a grounded resistor 870, to the control grid 871 of a pentode vacuum tube 872, said tube normally drawing considerable current by reason of the further connection of the control grid thereof through a resistor 873 to the power supply 760, whereby said tube 872 functions as an amplifier. The cathode 874 of said tube is grounded directly, and the anode 875 thereof is connected through a resistor 876, inductor 877 and another resistor 878 to the power supply 760, the latter resistor being by-passed to ground by a capacitor 879. The screen grid 880 is connected through a resistor 881, which is by-passed to ground by a capacitor 882, to the power supply 760, and the suppressor grid 883 is tied to the cathode.

The anode output of the tube 872 is applied through a capacitor 884 to the intensity or control grid 885 (Fig. 19B) of the cathode-ray tube 833.

Finally, the output of the timer 349 (Fig. 12), consisting of a rectangular voltage wave having a positive-going portion of a width comparable to several sweeps of the electron beam of the cathode-ray tube 833, for example, 270 microseconds, is applied, through a capacitor 886 and across a pair of series-connected and grounded resistors 887 and 888, to the control grid 889 of a pentode vacuum tube 890 adapted to function as an amplifier, said tube being normally biased beyond cut-off by connecting the junction of the resistors 887 and 888 through another resistor 891 to the negative bias supply 774. The cathode 892 of said tube is directly grounded, and the anode 893 thereof is connected to the screen grid 880 of the tube 872 and, through the resistor 881, to the power supply 760. The screen grid 894 of the tube 890 is connected to the adjustable arm of a potentiometer 895 which, in series with a resistor 896, is connected across the power supply 760, the adjustable arm of said potentiometer also being connected to ground through a capacitor 897. The suppressor grid 898 is tied to the cathode 892. The anode output of the tube 890 is adapted to cut off the tube 872 periodically, for example, once per second, thereby intensifying the electron beam of the cathode-ray tube 833 for the duration of a plurality of the sweeps of said beam.

Turning now to a description of the cathode-ray tube 833 itself, together with its associated circuit connections (Fig. 19B), it will be noted that said tube includes a cathode 899 which is connected through a resistor 900 and potentiometer 901 to the negative terminal of a bias supply 902 having its positive terminal grounded, said bias supply being of about 2000 volts and, together with said resistor and potentiometer, being by-passed to ground by a capacitor 903.

The previously referred to control grid 885, which is receptive of the output of the video amplifier tube 872, is connected through a resistor 904 and the adjustable arm of the potentiometer 901 to the negative bias supply 902, whereby the electron beam of the cathode-ray tube is normally maintained below the visibility level.

The junction of the cathode 899 and resistor 900 is connected through a resistor 905, a potentiometer 906 and three additional resistors 907, 908 and 909 to ground, the adjustable arm of the potentiometer 906 being connected, through a condenser 910, to ground, and, directly, to a second grid 911 in the cathode-ray tube, the potentiometer 906 constituting a focusing control. A third grid 912 in the cathode-ray tube is connected directly to ground.

In order to control the lateral location of the electron beam trace resulting from the push-pull sweep applied to the deflecting plates 832 and 835 from the sweep amplifier tubes 806 and 822, a pair of parallel-connected and oppositely-disposed potentiometers 913 and 914, the adjustable arms of which are ganged for simultaneous operation as indicated by the broken line, are connected across the power supply 760, the adjustable arm of the potentiometer 913 being connected through a resistor 915 to the deflecting plate 832, and the adjustable arm of the potentiometer 914 being connected through a resistor 916 to the deflecting plate 835. Both adjustable arms are connected to ground through a capacitor 917. The arrangement is such that a push-pull D.-C. bias is applied to said deflecting plates 832 and 835.

Another potentiometer 918 is connected across the power supply 760, this potentiometer having its adjustable arm connected in parallel to the vertical deflecting plates 919 and 920 of the cathode-ray tube 833 to enable auxiliary focusing.

Finally, three resistors 921, 922 and 923 are connected across another power supply 924, of very high voltage, for example, about 20,000 volts, the cathode-ray tube 833 including an external mounting ring 925 connected directly to the positive terminal of said power supply, an internal ring 926 likewise connected directly to said power supply, a second internal ring 927 connected to the junction of the resistors 921 and 922, a third internal ring 928 connected to the junction of the resistors 922 and 923, and a fourth internal ring 929 connected directly to ground.

Figure 26A:
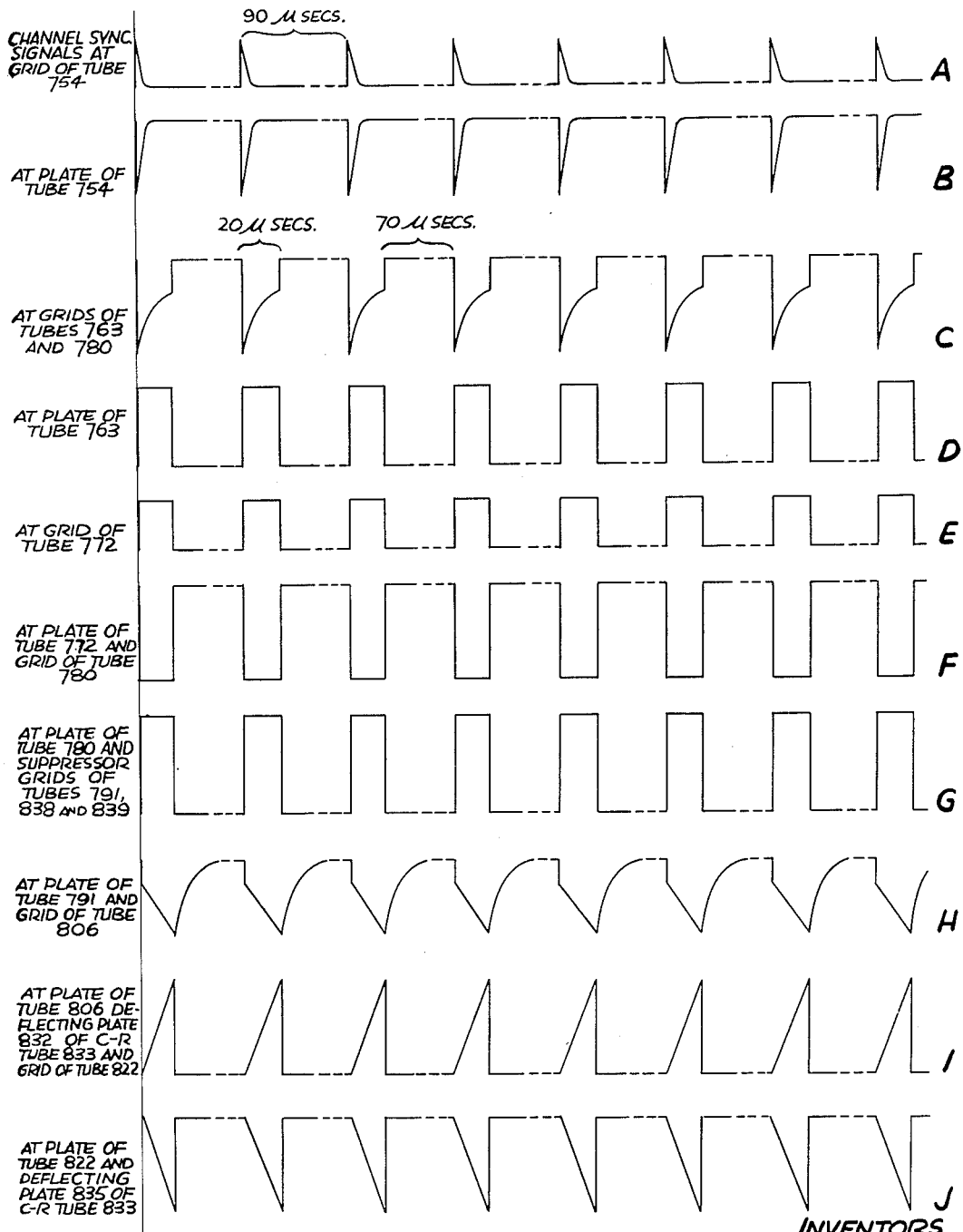
Figure 26B:
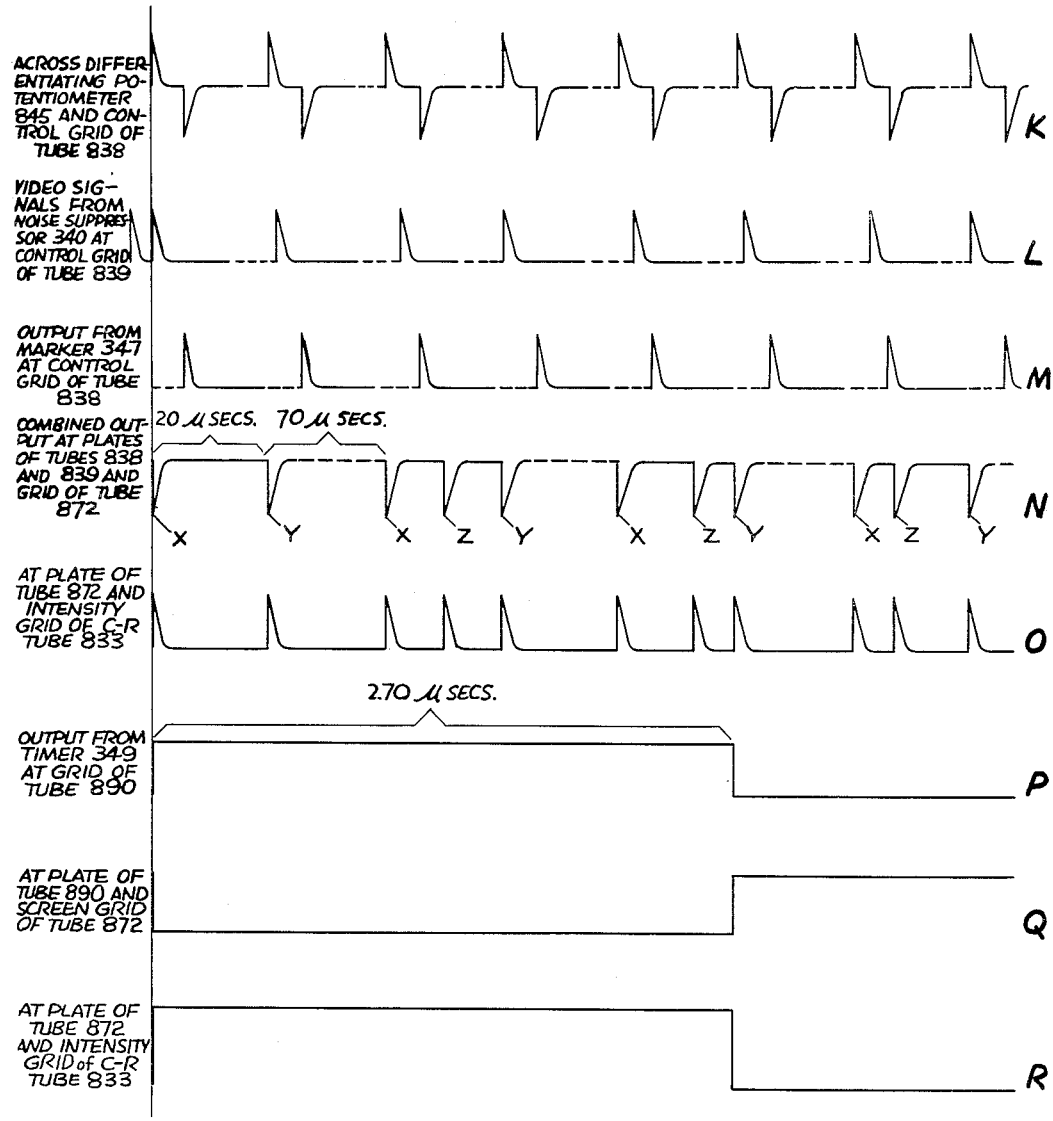

Reference is now made to Figs. 26A and 26B for an explanation of the operation of the indicator 341 just described.

At A in said Fig. 26A, there are shown the channel sync signals, separated by 90 microseconds, generated by the channel sync oscillator 344 (Fig. 12). These signals are amplified and inverted by the tube 754 as shown at B.

Now, the tube 754 is normally operated near cut-off and so draws a small current, resulting in a small drop across the resistor 759. The tube 763 normally draws considerable grid current which results in a relatively large drop across the series-connected resistor 764 and potentiometer 765. The tube 772 is normally biased beyond cut-off and there is no drop across the resistor 777. By reason of these initial conditions of the gating tubes 754, 763 and 772, the capacitors 761 and 778 are charged in opposition, with the facing plates thereof negative. When the tube 754 is made more conducting by the application of a pulse thereto, its anode goes negative, causing the grid of the tube 763 to go negative and rendering said tube 763 non-conducting. This raises the potential of the anode of the latter tube which, in turn, starts the tube 772 conducting. Under these conditions, the capacitors 761 and 778 commence to discharge. Even after the pulse applied to the tube 754 has passed, the conducting condition of the tube 772 permits the capacitor 778 to continue to discharge and hold off the tube 763 until the residual voltage across said capacitor 778 no longer drives sufficient current through the resistor 764 and potentiometer 765 to maintain the tube 763 non-conducting. When the latter starts to conduct, the tube 772 ceases conducting, and the capacitors 761 and 778 recharge to their initial conditions. The foregoing operations produce a voltage at the grid of the tube 763 as shown at C in Fig. 26A. It will be noted that the original relatively narrow pulses applied to the tube 754 have thus been widened. By properly adjusting the potentiometer 765, the pulses at the grid of the tube 763 may be given a width corresponding to that of a channel, namely, 20 microseconds.

The bias conditions on the tube 763 are such as to result at the anode thereof in the squared pulses shown at D. The similarly shaped but lesser amplitude pulses shown at E are applied to the grid 771 of tube 772, resulting in the amplified and inverted pulses shown at F at the anode of said tube 772 and at the grid of the tube 780. Of course, the voltage shown at C is also present at the grid of the tube 780, but, for practical purposes, it may be disregarded.

The latter pulses are amplified and inverted by said tube 780, as shown at G, and are utilized to trigger the sweep generator tube 791. There thus appears at the anode of the tube 791 and at the grid of the tube 806 the sweep voltage shown at H.

The tube 806 has a high anode voltage and is so biased as to produce at the anode thereof the saw-tooth wave shown at I. This is applied to the deflecting plate 832 of the cathode-ray tube 833. It is also applied to and inverted by the tube 822, as shown at J, the latter voltage being fed to the remaining deflecting plate 835 of the cathode-ray tube 833 to cooperate with the voltage of opposite phase on the deflecting plate 832 and thereby sweep the electron beam of said cathode-ray tube horizontally between said deflecting plates. Of course, the trace of the sweep is not visible on the screen of the cathode-ray tube because of the cut-off bias applied to the intensity grid 885 of said cathode-ray tube.

Now, the amplified gating puses shown at G are also applied to the suppressor grids of the tubes 838 and 839, these tubes being normally well beyond cut-off and being brought by these gating pulses to just below cut-off. Simultaneously, the squared gate at the anode of the tube 763 is differentiated across the R–C network 845—844 to produce the positive and negative-going pulses shown at K in Fig. 26B. These pulses are applied, coincidentally with the application of the gating pulses of G to the suppressor grids of the tubes 838 and 839, to the control grid of the tube 838. The video signals shown at L are applied to the control grid of the tube 839.

The marker pulses shown at M, which are 20 microseconds behind the positive-going pulses shown at K, are also applied to the control grid of the tube 838.

The anode outputs of the tubes 838 and 839 are combined, as shown at N, and are applied to the grid of the tube 872. In the last-named showing, the pulses marked X correspond to the positive-going pulses shown at K and indicate the commencement of each intelligence-conveying channel; the pulses marked Y correspond to the marker signals shown at M and indicate the end of each such channel; and the pulses marked Z correspond to the video signals shown at L and indicate the pulse-position-modulated, intelligence-conveying signals.

The tube 872 inverts the combined showing of N, as at O, and the latter are applied to the intensity grid 885 of the cathode-ray tube 833.

The output of the timer 349 (Fig. 12) is shown at P. This is fed to the tube 890 and is inverted at the anode thereof as at Q. When this output is applied to the screen grid of the tube 872, the anode of the latter appears as at R, and the application of this voltage to the control grid of the cathode-ray tube 833 intensifies and makes visible the sweeps occurring during the positive-going portions of said voltage R.

This completes the description of the pulse-position-modulated telemetering system of the present invention. Objects and advantages thereof, other than those specifically referred to in earlier portions of this specification, will readily occur to those skilled in the art to which the present invention relates.

What is claimed is:

1. A radio transmitter comprising: a first means, adapted to generate electrical oscillations of a relatively high frequency; a second means, adapted to generate electrical oscillations of a relatively low frequency; a third means, receptive of said last-named electrical oscillations, for deriving therefrom a plurality of signals of different relative phases; a fourth means, receptive of said last-named signals, for deriving therefrom a plurality of voltage pulses successively spaced from each other by predetermined time intervals; a fifth means, likewise receptive of said last-named signals, for deriving therefrom additional signals the amplitudes of which are characteristic, respectively, of externally generated intelligence; said additional signals being in phase quadrature, respectively, with said last-named signals, and being applied to said fourth means to vary the time intervals between said voltage pulses as a function of the magnitude of said externally generated intelligence; and a sixth means, receptive of said voltage pulses and coupled to said first means, for applying said voltage pulses to said first means and thereby modulate the latter.

2. A radio transmitter comprising: a first means, adapted to generate electrical oscillations of a relatively high frequency; a second means, adapted to generate electrical oscillations of a relatively low frequency; a third means, receptive of said last-named electrical oscillations, for repetitively deriving therefrom a plurality of signals of different relative phases; a fourth means, receptive of said last-named signals, for repetitively deriving therefrom a plurality of voltage pulses successively spaced from each other by predetermined time intervals; a fifth means, coupled to said fourth means, for periodically interrupting the repetitive generation of each of said voltage pulses in succession; and a sixth means, receptive of said voltage pulses and coupled to said first means, for applying said voltage pulses to said first means and thereby modulate the latter.

3. A radio transmitter comprising: a first means, adapted to generate electrical oscillations of a relatively high frequency; a second means, adapted to generate electrical oscillations of a relatively low frequency; a third means, receptive of said last-named electrical oscillations, for repetitively deriving therefrom a plurality of signals of different relative phases; a fourth means, receptive of said last-named signals, for repetitively deriving therefrom a plurality of voltage pulses successively spaced from each other by predetermined time intervals; a fifth means, likewise receptive of said last-named signals, for repetitively deriving therefrom additional signals the amplitude of which are characteristic, respectively, of externally generated intelligence; said additional signals being in phase quadrature, respectively, with said last-named signals, and being applied to said fourth means to vary the time intervals between said voltage pulses as a function of the magnitude of said externally generated intelligence; a sixth means, connected intermediate said fourth and fifth means, for periodically interrupting the repetitive generation of each of said voltage pulses in succession; and a seventh means, receptive of said voltage pulses and coupled to said first means, for applying said voltage pulses to said first means and thereby modulate the latter.

4. A radio transmitter comprising: a first means, adapted to generate electrical oscillations of a relatively high frequency; a second means, adapted to generate electrical oscillations of a relatively low frequency; a third means, receptive of said last-named electrical oscillations, for deriving therefrom a plurality of first signals of different relative phases; a fourth means, receptive of said first signals, for deriving therefrom a plurality of second signals in phase opposition, respectively, to said first signals; a fifth means, receptive of said first and second signals, for deriving therefrom a plurality of voltage pulses successively spaced from each other by predetermined time intervals; a sixth means, likewise receptive of said first and second signals, for deriving therefrom additional signals the amplitudes of which are characteristic, respectively, of externally generated intelligence; said additional signals being in phase quadrature, respectively, with said first and second signals, and being applied to said fifth means to vary the time intervals between said voltage pulses as a function of the magnitude of said externally generated intelligence; and a seventh means, receptive of said voltage pulses and coupled to said first means, for applying said voltage pulses to said first means and thereby modulate the latter.

5. A radio transmitter comprising: a first means, adapted to generate electrical oscillations of a relatively high frequency; a second means, adapted to generate electrical oscillations of a relatively low frequency; a third means, respective of said last-named electrical oscillations, for repetitively deriving therefrom a plurality of first signals of different relative phases; a fourth means, receptive of said first signals, for repetitively deriving therefrom a plurality of second signals in phase opposition, respectively, to said first signals; a fifth means, receptive of said first and second signals, for repetitively deriving therefrom a plurality of voltage pulses successively spaced from each other by predetermined time intervals; a sixth means, coupled to said fifth means, for periodically interrupting the repetitive generation of each of said voltage pulses in succession; and a seventh means, receptive of said voltage pulses and coupled to said first means, for applying said voltage pulses to said first means and thereby modulate the latter.

6. A radio transmitter comprising: a first means, adapted to generate electrical oscillations of a relatively high frequency; a second means, adapted to generate electrical oscillations of a relatively low frequency; a third means, receptive of said last-named electrical oscillations, for repetitively deriving therefrom a plurality of first signals of different relative phases; a fourth means, receptive of said first signals, for repetitively deriving therefrom a plurality of second signals in phase opposition, respectively, to said first signals; a fifth means, receptive of said first and second signals, for repetitively deriving therefrom a plurality of voltage pulses successively spaced from each other by predetermined time intervals; a sixth means, likewise receptive of said first and second signals, for repetitively deriving therefrom additional signals the amplitudes of which are characteristic, respectively, of externally generated intelligence; said additional signals being in phase quadrature, respectively, with said first and second signals, and being applied to said fifth means to vary the time intervals between said voltage pulses as a function of the magnitude of said externally generated intelligence; a seventh means, connected intermediate said fifth and sixth means, for periodically interrupting the repetitive generation of each of said voltage pulses in succession; and an eighth means, receptive of said voltage pulses and coupled to said first means, for applying said voltage pulses to said first means and thereby modulate the latter.

7. A radio transmitter comprising: a first means, adapted to generate electrical oscillations of a relatively high frequency; a second means, adapted to generate electrical oscillations of a relatively low frequency; a third means, receptive of said last-named electrical oscillations, for deriving therefrom a plurality of signals of different relative phases; a fourth means, receptive of one of said last-named signals, for deriving therefrom a characteristic signal adapted to serve as a reference denoting the start of each cycle of said last-named electrical oscillations from which said last-named signals are derived; a fifth means, receptive of the remainder of said last-named signals, for deriving therefrom a plurality of voltage pulses successively spaced from each other and from said characteristic signal by predetermined time intervals; a sixth means, likewise receptive of the remainder of said last-named signals, for deriving therefrom additional signals the amplitudes of which are characteristic, respectively, of externally generated intelligence; said additional signals being in phase quadrature, respectively, with said remainder of said last-named signals, and being applied to said fifth means to vary the time intervals between said voltage pulses as a function of the magnitude of said externally generated intelligence; and a seventh means, receptive of said characteristic signal and said voltage pulses and coupled to said first means, for applying said characteristic signal and said voltage pulses to said first means and thereby modulate the latter.

References Cited in the file of this patent
UNITED STATES PATENTS

| Number | Name | Date |
| --- | --- | --- |
| 2,048,081 | Riggs | July 21, 1936 |
| 2,395,467 | Deloraine | Feb. 26, 1946 |
| 2,408,077 | Labin | Sept. 24, 1946 |
| 2,414,265 | Lawson | Jan. 14, 1947 |
| 2,418,116 | Grieg | Apr. 1, 1947 |
| 2,447,233 | Chatterjea et al. | Aug. 17, 1948 |